US012452576B2

United States Patent
(12) United States Patent
Zhu et al.

(10) Patent No.: US 12,452,576 B2
(45) Date of Patent: Oct. 21, 2025

(54) ACOUSTIC OUTPUT DEVICE AND WEARABLE DEVICE

(71) Applicant: SHENZHEN SHOKZ CO., LTD., Guangdong (CN)

(72) Inventors: Guangyuan Zhu, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 343 days.

(21) Appl. No.: 18/320,945

(22) Filed: May 19, 2023

(65) Prior Publication Data

US 2023/0353926 A1 Nov. 2, 2023

Related U.S. Application Data

(63) Continuation of application No. PCT/CN2022/090663, filed on Apr. 29, 2022.

(51) Int. Cl.
*H04R 25/02* (2006.01)
*H04R 1/10* (2006.01)
*H04R 17/10* (2006.01)

(52) U.S. Cl.
CPC ........... *H04R 1/1075* (2013.01); *H04R 1/105* (2013.01); *H04R 17/10* (2013.01); *H04R 2460/09* (2013.01)

(58) Field of Classification Search
CPC .. H04R 17/00; H04R 17/005; H04R 2460/13; G02C 11/06
See application file for complete search history.

(56) References Cited

U.S. PATENT DOCUMENTS 7,822,215 B2 * 10/2010 Carazo .................... H04R 17/00 381/151
8,521,239 B2 * 8/2013 Hosoi ...................... H04M 1/05 455/66.1

(Continued)

FOREIGN PATENT DOCUMENTS

CN 103852890 A 6/2014
CN 106792322 A 5/2017

(Continued)

OTHER PUBLICATIONS

Partial Supplementary European Search Report in European Application No. 22893943.5 mailed on Dec. 22, 2023, 10 pages.

(Continued)

*Primary Examiner* — Ryan Robinson
(74) *Attorney, Agent, or Firm* — METIS IP LLC

(57) ABSTRACT

The embodiments of the present disclosure provide an acoustic output device, including: a first piezoelectric element configured to generate vibrations based on an audio signal; a fixing structure configured to place the acoustic output device near a user's ear without blocking the user's ear canal, an end of the fixing structure being connected to one end of the first piezoelectric element; and a vibration transmission component including an ear hook and an output assembly, one end of the ear hook being connected to an end of the first piezoelectric element away from the fixing structure, the other end of the ear hook being connected to the output assembly, the output assembly receiving the vibrations of the first piezoelectric element through the ear hook and outputting sound, and a frequency response curve of the sound having at least two resonant peaks.

20 Claims, 11 Drawing Sheets

(56) References Cited

U.S. PATENT DOCUMENTS

| | | | | |
|---|---|---|---|---|
| 9,554,223 | B2 * | 1/2017 | Hillbratt | H04R 25/456 |
| 10,511,901 | B2 * | 12/2019 | Garrett | H04R 1/1041 |
| 11,818,956 | B2 * | 11/2023 | Getman | A47C 7/748 |
| 2013/0051585 | A1 | 2/2013 | Karkkainen et al. | |
| 2020/0204901 | A1 | 6/2020 | Wang et al. | |
| 2020/0336824 | A1 | 10/2020 | Zheng et al. | |
| 2021/0014595 | A1 * | 1/2021 | Li | H04R 1/1058 |
| 2021/0219043 | A1 | 7/2021 | Li et al. | |

FOREIGN PATENT DOCUMENTS

| | | | | | |
|---|---|---|---|---|---|
| CN | 112190246 | A | | 1/2021 | |
| CN | 212785798 | U | | 3/2021 | |
| CN | 214544724 | U | | 10/2021 | |
| CN | 214708014 | U | | 11/2021 | |
| CN | 114236842 | A | | 3/2022 | |
| EP | 1542499 | A2 | * | 6/2005 | H04R 17/00 |
| KR | 20080041048 | A | * | 5/2008 | H04R 1/10 |
| WO | 2008145949 | A1 | | 12/2008 | |

OTHER PUBLICATIONS

The Extended European Search Report in European Application No. 22893943.5 mailed on Mar. 20, 2024, 10 pages.

Notice of Preliminary Rejection in Korean Application No. 10-2023-7022657 mailed on May 31, 2024, 10 pages.

* cited by examiner

100

ACOUSTIC OUTPUT DEVICE AND WEARABLE DEVICE

CROSS-REFERENCE TO RELATED APPLICATIONS

This application is a continuation of International Application No. PCT/CN2022/090663, filed on Apr. 29, 2022, and the entire contents of which are hereby incorporated by reference.

TECHNICAL FIELD

The present disclosure relates to the field of acoustics, and in particular, to an acoustic output device and a wearable device.

BACKGROUND

The acoustic output device driven by a piezo-ceramic may generate vibrations based on the inverse piezoelectric effect of the piezo-ceramic to radiate sound waves outward. Compared with traditional electric acoustic output devices, the acoustic output device driven by the piezo-ceramic has higher electromechanical conversion efficiency, lower energy consumption, smaller size, and higher integration. Compared with the traditional electromagnetic acoustic output device, the acoustic output device driven by the piezo-ceramic has a poor response at low frequencies.

To solve the above problems, it is desirable to provide an acoustic output device with an improved low-frequency response and fewer vibration modes in a target frequency range.

SUMMARY

One embodiment of the present disclosure provides an acoustic output device, including: a first piezoelectric element configured to generate vibrations based on an audio signal; a fixing structure configured to place the acoustic output device near a user's ear without blocking the user's ear canal, an end of the fixing structure being connected to one end of the first piezoelectric element; and a vibration transmission component including an ear hook and an output assembly, one end of the ear hook being connected to an end of the first piezoelectric element away from the fixing structure, the other end of the ear hook being connected to the output assembly, the output assembly receiving the vibrations of the first piezoelectric element through the ear hook and outputting sound, and a frequency response curve of the sound having at least two resonant peaks.

In some embodiments, the output assembly may include a contact surface in contact with the user's face, the end of the ear hook connected to the output assembly may be connected to a side of the output assembly and have a first connection surface, a projection of the ear hook on the first connection surface may be an ear hook projection curve, a first straight line may pass through a center point of the first connection surface and be tangent to the ear hook projection curve, and an angle between the contact surface and the first straight line may be in a range of 0°-50°.

In some embodiments, the ear hook may be connected to the first piezoelectric element and have a second connection surface, a connection point between the ear hook and the first piezoelectric element may be in the second connection surface, a straight line connecting the connection point between the ear hook and the first piezoelectric element and a connection point between the ear hook and the output assembly may be defined as a second straight line, and an angle between a projection of the first piezoelectric element on the second connection surface and the second straight line may be in a range of −20°-20°.

In some embodiments, when the user wears the acoustic output device, the contact surface of the output assembly may fit against a facial region near the user's ear.

In some embodiments, the fixing structure may be elastic and the fixing structure may be suspended on a rear side of the user's head when the user wears the acoustic output device.

In some embodiments, the at least two resonant peaks may include a first resonant peak, a resonant frequency corresponding to the first resonant peak may be in a range of 5 Hz-30 Hz.

In some embodiments, the output assembly may include an acoustic unit located inside the output assembly, a side wall of the output assembly may include a sound hole, and a sound generated by the acoustic unit may be transmitted to the outside of the output assembly through the sound hole.

In some embodiments, the acoustic output device may include a frequency division module configured to divide the audio signal into a high-frequency band component and a low-frequency band component; a high frequency signal processing module coupled to the frequency division module and configured to generate a high-frequency output signal based on the high-frequency band component; and a low-frequency signal processing module coupled to the frequency division module and configured to generate a low-frequency output signal based on the low-frequency band component.

In some embodiments, a division point between the high-frequency band component and the low-frequency band component may be in a range of 200 Hz-600 Hz, or may be in a range of 1000 Hz-3000 Hz.

In some embodiments, resonant frequencies corresponding to two resonant peaks closest to the division point in the at least two resonant peaks may be $f_1$ and $f_0'$, respectively, and $f_1$ and $f_0'$ may satisfy $$0 \le \frac{f_1 - f_0'}{f_1} \le 4.$$

In some embodiments, the acoustic output device may include a second piezoelectric element, the second piezoelectric element being connected to the fixing structure and configured to generate a voltage in response to a deformation of the fixing structure; and a processor configured to receive the voltage and, in response to that the voltage is not in a preset voltage range, output a control signal for generating a driving voltage applied to the second piezoelectric element to adjust a shape of the fixing structure.

In some embodiments, the second piezoelectric element may be located on the fixing structure at a position farthest from the output assembly.

In some embodiments, the second piezoelectric element may include a first sub-piezoelectric element and a second sub-piezoelectric element, the first sub-piezoelectric element generating the voltage with the deformation of the fixing structure; and the processor may receive the voltage and, in response to that the voltage is not in the preset voltage range, output a control signal for generating a driving voltage applied to the second sub-piezoelectric element to adjust the shape of the fixing structure.

In some embodiments, the fixing structure with an adjusted shape may provide a clamping force for the output assembly to fit near the user's ear, and the clamping force may be in a range of 0.1 N-0.8 N.

In some embodiments, the first sub-piezoelectric element may be located on the fixing structure at a position farthest from the output assembly, and the second sub-piezoelectric element may be located at a position of the fixing structure between the first sub-piezoelectric element and the ear hook.

An embodiment of the present disclosure provides a wearable device including: a fixing structure configured to place the wearable device at a user's head; a piezoelectric element connected to the fixing structure and configured to generate a voltage in response to a deformation of the fixing structure; and a processor configured to receive the voltage and, in response to that the voltage is not in a preset voltage range, output a control signal for generating a driving voltage applied to the piezoelectric element to adjust a shape of the fixing structure.

In some embodiments, the piezoelectric element may include a first sub-piezoelectric element and a second sub-piezoelectric element, the first sub-piezoelectric element generating the voltage with the deformation of the fixing structure; and the processor may receive the voltage and, in response to that the voltage is not in the preset voltage range, output a control signal for generating the driving voltage applied to the second sub-piezoelectric element to adjust the shape of the fixing structure.

In some embodiments, the fixing structure with an adjusted shape may provide a clamping force for the output assembly to fit near a user's ear, and the clamping force may be in a range of 0.1 N-0.8 N.

In some embodiments, the wearable devices may further include: a first piezoelectric component configured to generate vibrations based on an audio frequency signal, and the first piezoelectric element may be connected to an end of the fixing structure; and a vibration transmission component including an ear hook and an output assembly, one end of the ear hook being connected to an end of the first piezoelectric element away from the fixing structure, the other end of the ear hook being connected to the output assembly, the fixing structure placing the output assembly near the user's ear without blocking the user's ear canal, the output assembly receiving the vibrations of the first piezoelectric element through the ear hook and outputting sound, and a frequency response curve of the sound having at least two resonant peaks.

In some embodiments, the output assembly may include a contact surface in contact with the user's face, the end of the ear hook connected to the output assembly may be connected to a side of the output assembly and have a first connection surface, a projection of the ear hook on the first connection surface may be an ear hook projection curve, a first straight line passes through a center point of the first connection surface and may be tangent to the ear hook projection curve, and an angle between the contact surface and the first straight line may be in a range of 0°-50°.

In some embodiments, the ear hook may be connected to the first piezoelectric element and have a second connection surface, a connection point between the ear hook and the first piezoelectric element may be in the second connection surface, a straight line connecting the connection point between the ear hook and the first piezoelectric element and a connection point between the ear hook and the output assembly may be defined as a second straight line, and an angle between a projection of the first piezoelectric element on the second connection surface and the second straight line may be in a range of −20°-20°.

In some embodiments, when the user wears the wearable device, the contact surface of the output assembly may fit against a facial region near the user's ear.

In some embodiments, the fixing structure may be elastic and the fixing structure may be suspended on a rear side of the user's head when the user wears the wearable device.

In some embodiments, the at least two resonant peaks may include a first resonant peak, and a resonant frequency corresponding to the first resonant peak may be in a range of 5 Hz-30 Hz.

In some embodiments, the output assembly may include an acoustic unit located inside the output assembly, a side wall of the output assembly may include a sound hole, and a sound generated by the acoustic unit may be transmitted to an outside of the output assembly through the sound hole.

In some embodiments, the wearable device may include a frequency division module configured to divide the audio signal into a high-frequency band component and a low-frequency band component; a high-frequency signal processing module coupled to the frequency division module and configured to generate a high-frequency output signal based on the high-frequency band component; and a low-frequency signal processing module coupled to the frequency division module and configured to generate a low-frequency output signal based on the low-frequency band component.

In some embodiments, a division point between the high-frequency band component and the low-frequency band component may be in a range of 200 Hz-600 Hz, or may be in a range of 1000 Hz-3000 Hz.

In some embodiments, resonant frequencies corresponding to two resonant peaks closest to the frequency division point in the at least two resonant peaks may be $f_1$ and $f_0'$, respectively, and $f_1$ and $f_0'$ may satisfy $$0 \leq \frac{f_1 - f_0'}{f_1} \leq 4.$$

In some embodiments, the wearable device may include a speaker connected to an end of the fixing structure, wherein the fixing structure may place the speaker near the user's ear without blocking the user's ear canal, and when the user wears the wearable device, the fixing structure may be suspended on a rear side of the user's head.

In some embodiments, the wearable may include an air-conduction speaker connected to an end of the fixing structure, wherein the fixing structure may place the air-conduction speaker at a position covering the user's ear, and when the user wears the wearable device, the fixing structure may be suspended on a top of the user's head.

In some embodiments, the wearable device may include a visual component connected to an end of the fixing structure, wherein the fixing structure may place the visual component at the user's eyes, and when the user wears the wearable device, the fixing structure may be suspended on the user's ear.

In some embodiments, the visual component may be a lens or an optical display.

DETAILED DESCRIPTION

Figure 1:
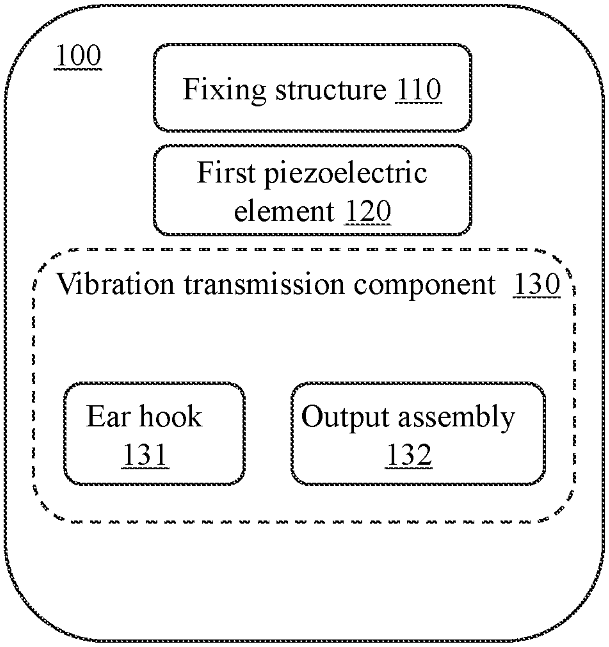
FIG. 1 is a block diagram illustrating an exemplary acoustic output device according to some embodiments of the disclosure.

In order to more clearly illustrate the technical solutions of the embodiments of the present disclosure, the following is a brief description of the accompanying drawings that are required to be used in the description of the embodiments. It will be apparent that the accompanying drawings in the following description are only some examples or embodiments of the present disclosure that may be applied to other similar situations on the basis of these drawings without creative effort. Unless it is obvious from the locale or otherwise stated, the same label in the diagram represents the same structure or operation.

It should be understood that the terms "system," "device," "unit," and/or "module" as used herein are a means to distinguish different components, elements, parts, sections, or assemblies at different levels. However, if other words may serve the same purpose, the words may be replaced by other expressions.

As shown in the present disclosure and the claims, unless the context clearly suggests an exception, the words "one," "a," "a kind of" and/or word "the" does not refer specifically to the singular, but may also include the plural form. In general, the terms "includes" and "comprises" suggest only the inclusion of clearly identified operations and elements that do not constitute an exclusive list, and the method or apparatus may also include other operations or elements.

Embodiments of the present disclosure describe an acoustic output device. In some embodiments, the acoustic output device may include a fixing structure configured to place the acoustic output device near a user's ear without blocking the user's ear canal. In some embodiments, the acoustic output device may include a first piezoelectric element configured to generate vibrations based on an audio signal, and one end of the first piezoelectric element is connected to an end of a fixing structure. In some embodiments, the acoustic output device may include a vibration transmission component including an ear hook and an output assembly, one end of the ear hook is connected to an end of the first piezoelectric element away from the fixing structure, and the other end of the ear hook is connected to an output assembly. The output assembly may receive the vibrations of the first piezoelectric element through the ear hook and outputs a sound. A frequency response curve of the sound may have at least two resonant peaks. In some embodiments, the at least two resonant peaks may include a first resonant peak. A resonant frequency of the first resonant peak may be in a range of 5 Hz-30 Hz. The acoustic output device provided in the embodiments of the present disclosure may be placed around the user's head through a fixing structure thereof. The vibration transmission component may receive the vibrations of the first piezoelectric element. Parameter information of the ear hook and the output assembly may be adjusted such that the acoustic output device may have better sensitivity in a lower frequency (for example, below 2000 Hz). In some embodiments, the acoustic output devices may be applied to electronic devices with audio capabilities (e.g., headphones, glasses, smart helmets, etc.).

Embodiments of the present disclosure also describe a wearable device. In some embodiments, the wearable device may include a fixing structure configured to be placed on a user's body. In some embodiments, the wearable device may include a piezoelectric element connected to the fixing structure, and the piezoelectric element may generate a voltage in response to a deformation of the fixing structure when the user wears the wearable device through the fixing structure. A processor of the wearable device may receive the voltage of the piezoelectric element and, in response to that the voltage is not in a preset voltage range, output a control signal applied to the piezoelectric element and generate a driving voltage applied to the piezoelectric element to adjust a shape of the fixing structure. In such cases, a clamping force between the fixing structure and the user's body may be adjusted. The wearable device provided by the embodiments of the present disclosure may control the piezoelectric element by the processor so as to achieve the adjustment of the clamping force between the fixing structure and the user's body, thereby improving an experience of the user wearing the wearable device. In some embodiments, the wearable device may be implemented as at least one of a speaker, a hearing aid, a pair of glasses, a virtual reality device, a reality augmentation device, a smart watch, etc.

FIG. 1 is a block diagram illustrating an exemplary acoustic output device according to some embodiments of the disclosure. As shown in FIG. 1, an acoustic output device 100 may include a fixing structure 110, a first piezoelectric element 120, and a vibration transmission component 130. An end of the fixing structure 110 is connected to an end of the first piezoelectric element 120, and an end of the first piezoelectric element 120 away from the fixing structure 110 is connected to the vibration transmission component 130. When a user wears the acoustic output device, the fixing structure 110 may place the vibration transmission component 130 near the user's ear without blocking the user's ear canal.

The fixing structure 110 may be a structure to be placed on the user's head. In some embodiments, the fixing structure 110 may encircle the user's head. For example, the fixing structure 110 may be a band, an elongated structure, etc., or any combination thereof that encircles a head region such as a rear side, a forehead, or a top of the user's head. In some embodiments, the fixing structure 110 may have a curved structure that fits around the head of the human body such that the fixing structure 110 may fit around the head of the user such as the rear side, the forehead, or the top of the head. In some embodiments, the fixing structure 110 may be an elastic structure, and a material of the fixing structure 110 may include, but is not limited to, polycarbonate, polyamide, silicone, rubber, etc. In some embodiments, the fixing structure 110 may include a rear hook (e.g., a fixing structure 210 in FIG. 2), and the rear hook may have a curved structure adapted to a rear profile of the user's head. In some embodiments, the fixing structure 110 may be a structure adapted to the user's ear, and the fixing structure 110 may be suspended on or clamped at the user's ear. For example, the fixing structure 110 may be clamped at the user's ear. Specifically, the fixing structure 110 may include a clamping part that can be clamped at the user's ear. As another example, the fixing structure 110 may be suspended on the user's ear. Specifically, the fixing structure 110 may have a curved structure adapted to an auricle such that the fixing structure 110 may be suspended on the user's ear. More descriptions of the fixing structure may be found elsewhere in the present disclosure, such as FIG. 2 and the related descriptions thereof.

The first piezoelectric element 120 may be a device that converts an audio signal into mechanical vibrations. Due to an inverse piezoelectric effect of the first piezoelectric element 120, the first piezoelectric element 120 may generate mechanical vibrations when an electrical signal is applied to the first piezoelectric element 120. In some embodiments, the first piezoelectric element 120 may be made of a piezoelectric material. Exemplary piezoelectric materials may include piezoelectric ceramics, piezoelectric crystals (e.g., barium titanate, lead zirconate titanate, etc.), piezoelectric polymers (e.g., vinylidene fluoride), etc., or any combination thereof. In some embodiments, the first piezoelectric element 120 may have any shape, such as a sheet, a block, a column, a ring structure, etc., or any combination thereof. More descriptions of the first piezoelectric element may be found elsewhere in the present disclosure, such as FIG. 2 and related descriptions thereof.

The vibration transmission component 130 may be a component that converts the mechanical vibrations of the first piezoelectric element 120 into an acoustic signal. In some embodiments, the vibration transmission component 130 may generate vibrations in response to the vibrations of the first piezoelectric element 120, thereby generating a sound. In some embodiments, the vibration transmission component 130 may include an ear hook 131 and an output assembly 132. One end of the ear hook 131 may be connected to an end of the first piezoelectric element 120 away from the fixing structure 110, and the other end of the ear hook 131 may be connected to the output assembly 132. The output assembly 132 may receive the vibrations of the first piezoelectric element 120 through the ear hook 131. When the user wears the acoustic output device 100, at least a portion of the output assembly 132 may be in contact with the user's face. The output assembly 132 may transmit the received vibrations directly to the user's auditory nerve through the user's muscles, bones, blood, etc., such that sound information corresponding to the acoustic signal may be heard. In some embodiments, the at least a portion of the output assembly 132 may be a side surface of the output assembly 132. In some embodiments, the at least a portion of the output assembly 132 may include a convex structure on a side surface of the output assembly 132. In some embodiments, the output assembly 132 may receive the vibrations of the first piezoelectric element 120 through the ear hook 131 and output the sound. A frequency response curve of the sound may have at least two resonant peaks. The vibration transmission component 130 including the ear hook 131 and the output assembly 132 may be considered as a resonant system, wherein the ear hook 131 may provide elasticity to the resonant system and the output assembly 132 may provide a mass to the resonant system, and the ear hook 131 and the output assembly 132 may provide a first resonant peak for the acoustic output device 100 in a low-frequency band, such that the acoustic output device 100 may have a better frequency response at a lower frequency. For example, in some embodiments, a resonant frequency of the first resonant peak may be in a range of 5 Hz-30 Hz. In some embodiments, the resonant frequency of the acoustic output device 100 in the low-frequency band may be adjusted by adjusting an elastic coefficient of the ear hook 131 or the mass of the output assembly 132. The resonant frequency corresponding to the first resonant peak may be low enough such that since the frequency response in the frequency band after the first resonant peak is also increased, the acoustic output device 100 may have a better frequency response in the low-frequency band (e.g., 20 Hz-1000 Hz).

The ear hook 131 refers to a structure that is adapted to fit the user's ear. For example, the ear hook may be a curved structure suspended on the ear. In some embodiments, the ear hook 131 may have a curved part (e.g., an ear hook 231 shown in FIG. 2), and the curved part adapted to the human ear may be suspended on the user's ear. In some embodiments, the ear hook 131 may be made of an elastic material. Exemplary elastic materials may include plastic, foam, rubber, latex, silicone, sponge, metal, alloy materials, etc., or any combination thereof. More descriptions of the ear hook may be found elsewhere in the present disclosure, such as FIG. 2 and the related descriptions thereof.

The output assembly 132 may be a component with mass. In some embodiments, the output assembly 132 may be in contact with the user's face. In some embodiments, the output assembly 132 may include a contact surface that contacts the user's face. In some embodiments, the output assembly 132 may have any shape, such as a regular structure (such as a cylinder, a cuboid, a cone, a truncated cone, a sphere, etc.) or an irregular structure. In some embodiments, the material of the output assembly 132 may include, but is not limited to, any material with a certain rigidity such as plastic, wood, metal, etc. In some embodiments, the material of the mass element 120 may also include various metamaterials that facilitate an expansion of the audio bandwidth of the acoustic output device 100, such as negative stiffness materials, cubic stiffness materials, etc. The vibration transmission component 130 including the ear hook 131 and the output assembly 132 may enable the acoustic output device 100 to have resonant peaks in the low-frequency range, and improve the low-frequency response of the acoustic output device 100. In some embodiments, the output assembly may also include an acoustic unit. The output assembly may include a cavity, and the acoustic unit may be located in the cavity. The acoustic unit may output sound based on the audio signal to supplement the sound generated by the vibrations of the output assembly. More descriptions of the output assembly may be found elsewhere in the present disclosure, such as FIG. 2 and the related descriptions thereof.

Figure 2:
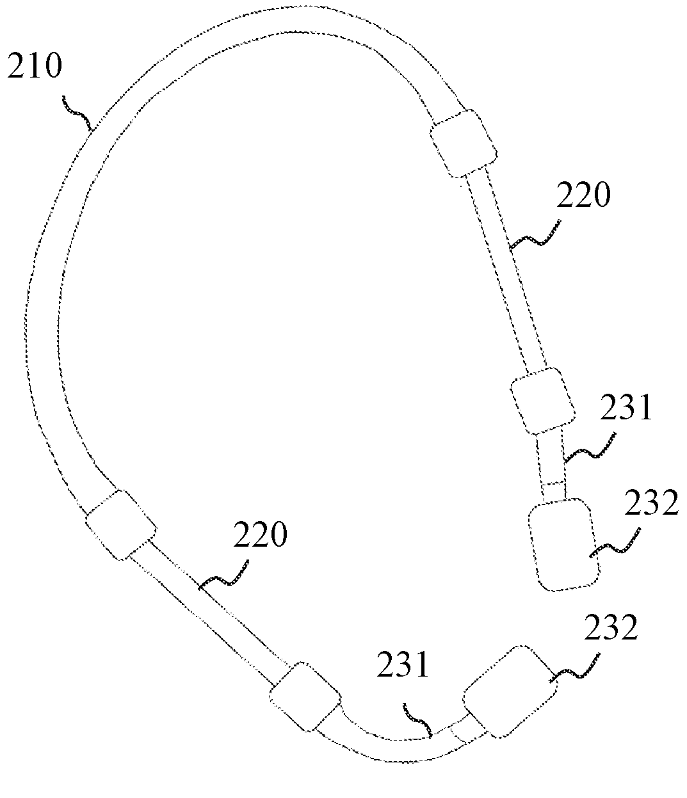
FIG. 2 is a schematic diagram illustrating a structure of an exemplary acoustic output device according to some embodiments of the present disclosure.

FIG. 2 is a schematic diagram illustrating a structure of an exemplary acoustic output device according to some embodiments of the present disclosure. As shown in FIG. 2, the acoustic output device may include an output assembly (assemblies) 232, an ear hook(s) 231, a first piezoelectric element(s) 220, and a fixing structure 210. An end of the fixing structure 210 may be connected to the ear hook 231 through the first piezoelectric element 220, and an end of the ear hook 231 away from the first piezoelectric element 220 may be connected to the output assembly 232. When a user wears the acoustic output device, the fixing structure 210 may place the output assembly 232 near the user's ear without blocking the user's ear canal.

In some embodiments, when the user wears the acoustic output device, the fixing structure 210 may be suspended on a rear side of the user's head. In some embodiments, the fixing structure 210 may include a rear hook with a curved shape to fit the rear side of the user's head. In some embodiments, in order to adapt to different user's head shapes, the fixing structure 210 may be flexible, or a length and a shape of the fixing structure 210 may be adjustable. For example, the length of the fixing structure may be adjusted through a snap. In some embodiments, the fixing structure 210 may include an elastic metal wire and an elastic sleeve that covers the elastic metal wire. Further, the material of the elastic metal wire may include, but is not limited to, spring steel, titanium alloy, titanium-nickel alloy, chromium-molybdenum steel, etc., and the material of the elastic sleeve may include, but is not limited to, polycarbonate, polyamide, silicone, rubber, etc., which takes into account the comfort of wearing the fixing structure 210 and the stiffness of the fixing structure 210.

In some embodiments, two ends of the fixing structure 210 are respectively connected to the first piezoelectric element 220, the ear hook 231, and the output assembly 232 in sequence. The fixing structure 210 may wrap around the rear side of the user's head, the ear hook 231 at each end of the fixing structure 210 may be suspended on the user's ear, and the output assembly 232 may be distributed near the user's ear (e.g., a front, back, top, or bottom side of the ear of the head). In some embodiments, the first piezoelectric element 220 may include a fixed end and a free end. The fixed end may be the end of the first piezoelectric element 220 that provides a fixation or support for other portions of the first piezoelectric element 220. For example, during vibrations, the fixed end may have less vibration intensity relative to the other portions of the first piezoelectric element 220 (e.g., the free end). Merely by way of example, the fixed end may be a position on the first piezoelectric element 220 with a vibration acceleration less than a vibration acceleration threshold or with an acceleration level less than an acceleration level threshold. In some embodiments, the fixed end may be connected to an end of the fixing structure 210. The end of the fixing structure 210 may be any portion of the fixing structure 210 on the end face of the fixing structure 210 and/or near the end face of the fixing structure 210. The connection described in the present disclosure may include a bolted connection, a riveted connection, an interference fit, a snap, a bonding, an injection molding, a welding, a magnetic suction, or any combination thereof. The free end here is the end on the first piezoelectric element 220 that connects and drives the output assembly 232 to vibrate to produce sound, which may vibrate more freely relative to the fixed end. In some embodiments, the free end of the first piezoelectric element 220 may be connected to the ear hook 231.

In some embodiments, the ear hook 231 may have a curved part, and the curved part adapted to the human ear may hang above the user's ear. To ensure that the ear hook 231 may receive and transmit the vibrations generated by the first piezoelectric element 220 effectively, in some embodiments, the ear hook 231 may include an elastic metal wire and an elastic sleeve that covers the elastic metal wire. Further, the material of the elastic metal wire may include, but is not limited to, spring steel, titanium alloy, titanium-nickel alloy, chromium-molybdenum steel, etc., and the material of the elastic sleeve may include, but is not limited to, polycarbonate, polyamide, silicone, rubber, etc.

In some embodiments, the output assembly 232 may be a regular structure such as a cuboid, a cylinder, a truncated cone, an ellipsoid, a hemisphere, or a terrace, etc., or an irregular structure. In some embodiments, the output assembly 232 may include a contact surface that contacts the user's face, and when the user wears the acoustic output device, the contact surface of the output assembly 232 may fit against a facial region near the user's ear such that the user may receive sound information output by the output assembly 232. In some embodiments, the contact surface of the output assembly 232 that is in contact with the user's face may be a sidewall of the output assembly 232. For example, when the output assembly 232 is a cylinder, the contact surface may be a bottom surface of the cylinder. In some embodiments, the output assembly 232 may also include one or more convex structures disposed on an outer wall of the output assembly 232. In such cases, the contact surface may be an end of the convex structures away from the output assembly 232.

It should be noted that the first piezoelectric element 220 may also be at least partially attached to the fixing structure 210. For example, a portion of the first piezoelectric element 220 may be attached to a sidewall of the fixing structure 210, and another portion of the first piezoelectric element 220 may protrude relative to the end of the fixing structure 210 and may be attached to an end or a sidewall of the ear hook 231. As another example, the entire structure of the first piezoelectric element 220 may be attached to the fixing structure 210, the first piezoelectric element 220 may generate vibrations based on the audio signal and drive the fixing structure 210 to vibrate, and the vibrations of the fixing structure 210 may be transmitted by the ear hook 231 to the output assembly 232.

Figure 3:
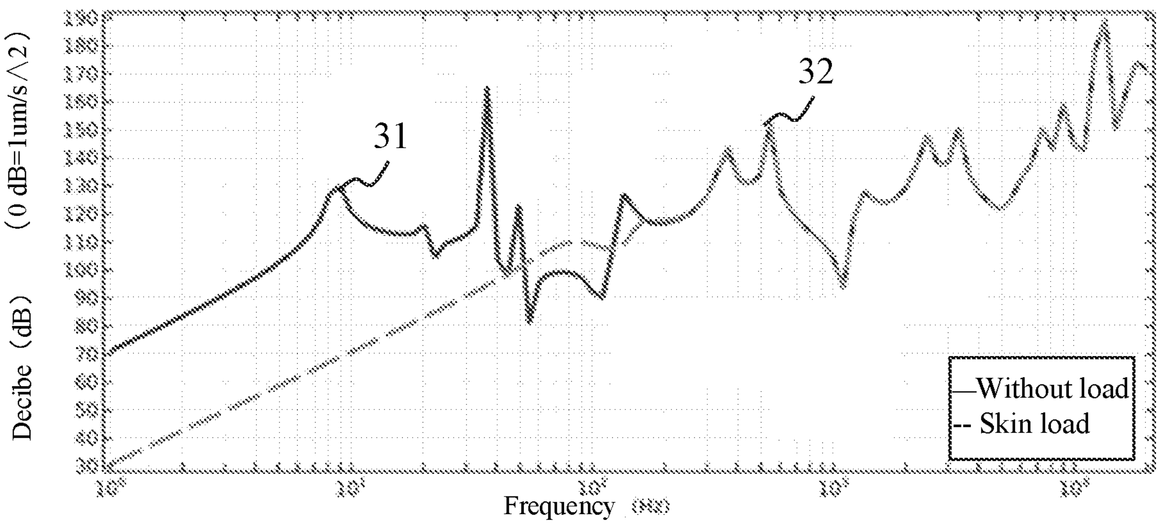
FIG. 3 is a graph illustrating frequency response curves of an output assembly according to some embodiments of the present disclosure.

When the user wears the acoustic output device, the output assembly of the acoustic output device may contact the user's face, and the output assembly may be affected by the user's skin during the vibration process. The user's skin may be regarded as a damping structure such that a frequency response curve of the acoustic output device in a "load" state may be different from the frequency response curve of the acoustic output device in the "without load" state in the low-frequency band. See, e.g., FIG. 3 and related descriptions thereof. FIG. 3 is a graph illustrating frequency response curves of an output assembly according to some embodiments of the present disclosure. As shown in FIG. 3, the frequency response curve of the output assembly when the acoustic output device is not worn on the user's head (the frequency response curve corresponding to "without load" shown in FIG. 3) has a first resonant peak 31 in a low-frequency band (e.g., 5 Hz-30 Hz), which indicates that the acoustic output device has a higher sensitivity in the low-frequency band. Further, when the acoustic output device is worn on the user's head, the output assembly of the acoustic output device is in contact with the user's face, and the output assembly may be affected by the user's skin during the vibration. The user's skin may be considered as a damping structure.

Due to a damping effect of the skin, the frequency response curve of the output assembly when the user wears the acoustic output device (the frequency response curve shown in FIG. 3 corresponding to "skin load") is smoother in the low-frequency range (e.g., 5 Hz-500 Hz), which indicates that the acoustic output device has a better sound quality in the low-frequency range when it is used.

In some embodiments, the output assembly 232 may receive the vibrations of the first piezoelectric element 220 via the ear hook 231 and have at least two resonant peaks in the frequency range of 5 Hz-50,000 Hz. The at least two resonant peaks may include a first resonant peak 31. In some embodiments, the resonant frequency corresponding to the first resonant peak 31 may be in a range of 5 Hz-30 Hz. For example, the resonant frequency corresponding to the first resonant peak 31 may be in a range of 7 Hz-20 Hz. As another example, the resonant frequency corresponding to the first resonant peak 31 may be in a range of 6 Hz-10 Hz.

In some embodiments, the first resonant peak of the acoustic output device may be made to be in a particular frequency band (e.g., 5 Hz-30 Hz) by adjusting the mass of the output assembly 232 or the elastic coefficient of the ear hook 231. In some embodiments, the mass of the output assembly may be in a target mass range to control the resonant frequency corresponding to the first resonant peak. In some embodiments, the target mass range may be no greater than 10 g. In some embodiments, the target mass range may be 0.01 g-10 g. In some embodiments, the target mass range may be 0.2 g-6 g. In some embodiments, the target mass range may be 1 g-5 g. In some embodiments, to control the resonant frequency of the first resonant peak, the elastic coefficient of the ear hook may be in the target elastic coefficient range. In some embodiments, the target elastic coefficient range may be 9 N/m-$6\times10^6$ N/m. In some embodiments, the target elastic coefficient range may be 100 N/m-$6\times10^6$ N/m. In some embodiments, the target elastic coefficient range may be 100 N/m-$1\times10^6$ N/m. In some embodiments, a ratio of the elastic coefficient of the ear hook to the mass of the output assembly may be adjusted such that the acoustic output device may have a first resonant peak in the frequency range of 5 Hz-30 Hz, thereby improving the low-frequency response of the acoustic output device. In some embodiments, the range of the ratio of the elastic coefficient to the mass may be in a target ratio range. In some embodiments, the target ratio range may be $4.9\times10^6$-$3.2\times10^{11}$. In some embodiments, the target ratio range may be $4.5\times10^6$-$3\times10^{11}$. In some embodiments, the target ratio range may be $4\times10^6$-$4\times10^{10}$. In some embodiments, the target ratio range may be $1\times10^6$-$1\times10^9$. It should be noted that the first resonant peak may also not be in the frequency range described above (e.g., 5 Hz-30 Hz). For example, the resonant frequency corresponding to the first resonant peak may be 15 Hz, 20 Hz, or greater, and the resonant frequency corresponding to the first resonant peak may be adjusted depending on the application scenario of the acoustic output device.

In some embodiments, the at least two resonant peaks of the frequency response curve of the output assembly may further include a second resonant peak 32. The resonant frequency corresponding to the first resonant peak 31 may be less than a resonant frequency corresponding to the second resonant peak 32. The second resonant peak may be related to parameter information of the first piezoelectric element (e.g., the material of the piezoelectric layer, a thickness, a length, a width, etc. of a piezoelectric layer and/or a substrate layer). The acoustic output device may also have better sensitivity at a higher frequency (e.g., 1000 Hz-40,000 Hz) by utilizing properties of the first piezoelectric element (e.g., an intrinsic frequency of the first piezoelectric element). In such cases, the acoustic output device provided by the embodiments of the present disclosure may have better sensitivity in both the low-frequency band (e.g., 20 Hz-1000 Hz) and the high-frequency band (e.g., 1000 Hz-40,000 Hz).

To make the output assembly 232 to be located near the user's ear when the user wears the acoustic output device, and to ensure the user's wearing experience, the ear hook 231 may have a curved shape, which may result in that the frequency response curve corresponding to the output assembly 232 has resonant peaks other than the first resonant peak 31 such as a resonant peak between the first resonant peak 31 and the second resonant peak 32 in the frequency response curve shown in FIG. 3 corresponding to "without load". In addition, the resonance of the first piezoelectric element itself may generate resonant peaks or resonance valleys in the frequency response curve of the output assembly 232, and the resonance valleys may affect the sound quality of the acoustic output device in the high-frequency band.

To reduce the unevenness of the frequency response curve (for example, an occurrence of too many resonant peaks or valleys) caused by the ear hook and the properties of the piezoelectric element, and improve the sound quality of the acoustic output device, in some embodiments, the output assembly 232 may include an acoustic unit (not shown in FIG. 2). For example, the output assembly 232 may have a cavity, and the acoustic unit may be located in the cavity of the output assembly 232. The acoustic unit may generate a sound based on an audio signal of the acoustic output device to supplement the sound generated by the vibrations of the output assembly in a specific frequency range. For example, in response to the vibrations of the first piezoelectric element 220, the output assembly 232 may output the sound at a low frequency (e.g., 20 HZ-600 Hz), and the acoustic unit may output sound at a higher frequency (e.g., greater than 600

Hz) to improve the sound quality of the acoustic output device in the full frequency range. As another example, the acoustic unit may also supplement the sound of the lower frequency (e.g., 20 Hz-600 Hz) to compensate for an acoustic output effect of the output assembly 232 at the lower frequency. In some embodiments, the acoustic unit may include an air conduction speaker, and the side wall of the output assembly 232 may have sound holes through which the sound generated by the acoustic unit is transmitted to the outside. In some embodiments, the acoustic unit may include a bone-conduction speaker, and vibrations generated by the bone-conduction speaker may be transmitted to the outside through the side wall of the output assembly 232. The bone conduction speaker may have an improved frequency response at the low frequency, which may compensate the acoustic output effect of the acoustic output device at the low frequency effectively.

In some embodiments, the acoustic output device may include a frequency division module configured to divide the audio signal into a high-frequency band component and a low-frequency band component. In some embodiments, the acoustic output device may also include a high-frequency signal processing module and a low-frequency signal processing module. The high-frequency signal may be coupled to the frequency division module and configured to generate a high-frequency output signal based on the high-frequency band component, and the low-frequency signal processing module may be coupled to the frequency division module and configured to generate a low-frequency output signal based on the low-frequency band component. In some embodiments, the first piezoelectric element 220 may vibrate in response to the low-frequency signal, that is, the output assembly 232 may receive the vibrations of the first piezoelectric element 220 through the ear hook 231 and generate vibrations to output a low-frequency sound, and the acoustic unit may output a high-frequency sound based on a high-frequency output signal. In such cases, the acoustic output device may have improved sound quality in the whole frequency band. In some embodiments, the first piezoelectric element 220 may vibrate in response to the high-frequency signal, that is, the output assembly 232 may receive the vibrations of the first piezoelectric element 220 through the ear hook 231 and generate vibrations to output a high-frequency sound, and the acoustic unit may output a low-frequency sound based on a low-frequency output signal. In such cases, the acoustic output device may have improved sound quality in the whole frequency band. In some embodiments, a frequency division point of the audio signal division module for dividing the audio signal may be in a range of 200 Hz-600 Hz. For example, the frequency division point may be 300 Hz. In such cases, the audio signal less than 300 Hz may be the low-frequency band component, and the audio signal greater than 300 Hz may be the high-frequency band component. In some embodiments, the frequency division point of the frequency division module for dividing the audio signal may be in a range of 1000 Hz-3000 Hz. For example, the frequency division point may be 1000 Hz. In such cases, the audio signal less than 1000 Hz may be the low-frequency band component, and the audio signal greater than 1000 Hz may be the high-frequency band component. It should be noted that the frequency division point is not limited to the above ranges. The frequency division point may be adjusted based on different application scenarios. For example, the frequency division point may be in a range of 100 HZ-500 Hz, 600 Hz-1000 Hz, or 3000 HZ-5000 Hz. To improve the acoustic output effect of the acoustic output device in both the low and the high-frequency bands, the frequency division point may be determined based on the resonant peaks corresponding to the frequency response curves of the output assembly 232 and the acoustic unit. In some embodiments, the frequency response curve of the output assembly 232 may have two resonant peaks at a point closest to the frequency division point. The corresponding resonant frequencies of the two resonant peaks near the frequency division point are respectively $f_1$ and $f_0'$, and the relative relationship between $f_1$ and $f_0'$ may be:

$$0 \le \frac{|f_1 - f_0'|}{f_1} \le 4. \tag{1}$$

In some embodiments, a test manner of the frequency division point may include: a high-frequency signal is applied to the first piezoelectric element 220, the output assembly 232 receives the vibrations of the first piezoelectric element 220 through the ear hook 231 and generates the vibrations to output high-frequency sound, and a high-frequency response curve of the vibrations of the output assembly 232 may be obtained. Further, a low-frequency signal is applied to the acoustic unit in the output assembly 232 to obtain a low-frequency response curve corresponding to the acoustic unit. The frequency division point may be in a frequency band in which the low-frequency response curve decreases significantly and the high-frequency response curve increases significantly. In some embodiments, the resonant frequencies $f_1$ and $f_0'$ of the two resonant peaks near the frequency division point may correspond to different frequency response curves respectively. For example, the high-frequency response curve may have a resonant peak at the resonant frequency $f_0'$, while the low-frequency response curve may have a resonant peak at the resonant frequency $f_1$.

It should be noted that the structure of the acoustic output device shown in FIG. 2 is for illustrative purposes only and is not intended to limit the scope of the present disclosure. In some embodiments, only one end of the fixing structure 210 shown in FIG. 2 is connected to the first piezoelectric element 220, the ear hook 231, and the output assembly 232 in sequence, and the other end of the fixing structure 210 may not be provided with the first piezoelectric element 220, the ear hook 231, and the output assembly 232. Instead, the other end of the fixing structure 210 may be directly fixed to the user's head (such as at the rear side of the head) or suspended on the user's auricle.

To further improve the acoustic output effect of the acoustic output device, in some embodiments, the relative positions between the output assembly, the ear hook, and the first piezoelectric element may be adjusted. A relative position between the output assembly and the ear hook may be represented by a first angle parameter, and the relative position between the ear hook and the first piezoelectric element may be represented by a second angle parameter. For details of the first and the second angle parameters, please refer to FIG. 4-FIG. 8 and related descriptions thereof.

Figure 4:
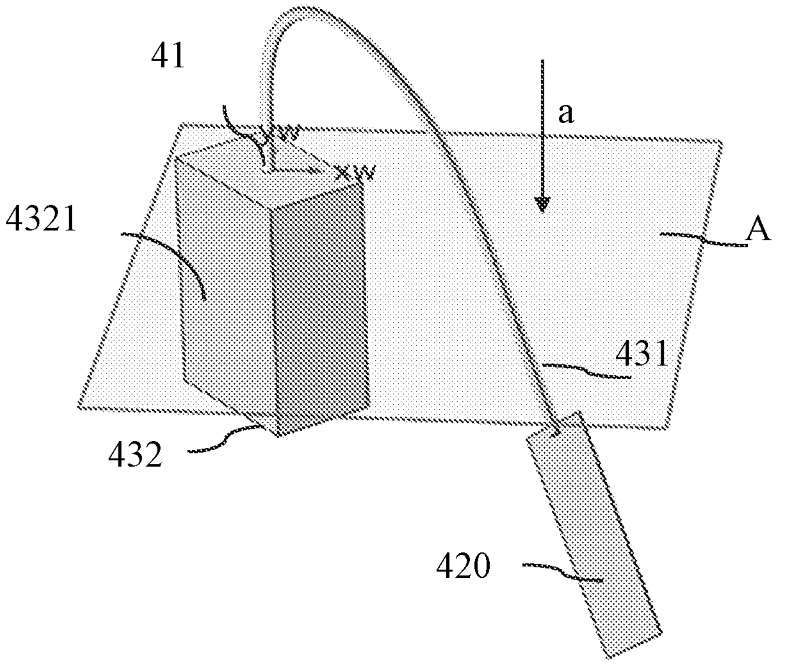
FIG. 4 is a schematic diagram illustrating a partial structure of an acoustic output device according to some embodiments of the present disclosure.
Figure 5:
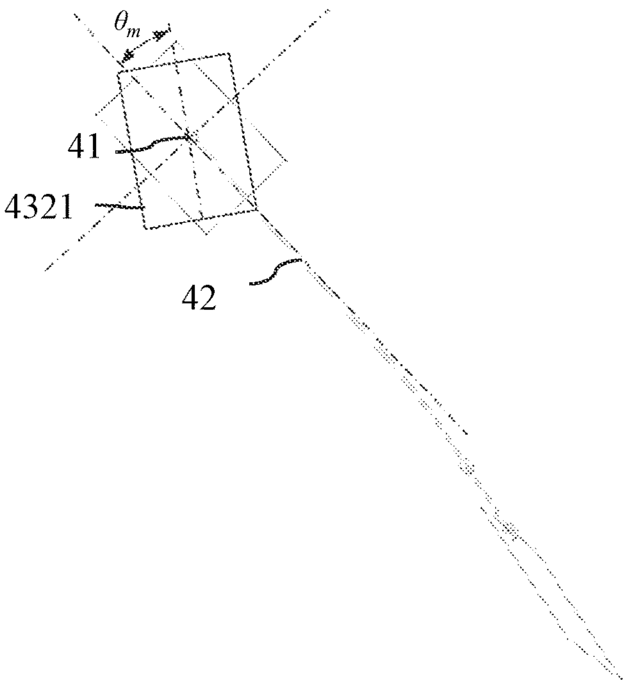
FIG. 5 is a schematic diagram illustrating a projection of a partial structure of an acoustic output device on a first connection surface of an ear hook connecting an output assembly according to some embodiments of the present disclosure.

FIG. 4 is a schematic diagram illustrating a partial structure of the acoustic output device according to some embodiments of the present disclosure. An output assembly 432 having a rectangular structure may be taken as an example. As shown in FIG. 4, the output assembly 432 may include a contact surface 4321 in contact with a user's face. A first piezoelectric element 420 is connected to one end of an ear hook 431, and the other end of the ear hook 431 is connected to a side surface of the output assembly 432 and may have a first connection surface A. The first connection surface A may be regarded as the end face of the end of the ear hook 431 (for example, a plane defined by the xw and yw axes shown in FIG. 4). A projection of the ear hook 431 on the first connection surface A along a direction a (perpendicular to the first connection surface A) may be shown in FIG. 5. FIG. 5 is a schematic diagram illustrating a projection of the partial structure of the acoustic output device on a first connection surface of an ear hook connecting the output assembly according to some embodiments of the present disclosure. According to FIG. 4 and FIG. 5, a projection of the ear hook 431 on the first connection surface A is an ear hook projection curve. A first straight line 42 may pass through a center point 41 of the first connection surface A and be tangent to the ear hook projection curve. An angle $\theta_m$ between the contact surface 4321 of the output assembly 432 and the first straight line 42 may be regarded as a first angle parameter. It should be noted that the center point 41 of the first connection surface A refers to a geometric center point of the end of the ear hook 431 connected to the output assembly 432. When a size of the end (for example, a length, a width, or a radius) of the ear hook 431 is small, the end of the ear hook 431 may be approximately regarded as the center point of the first connection surface A.

Figure 6:
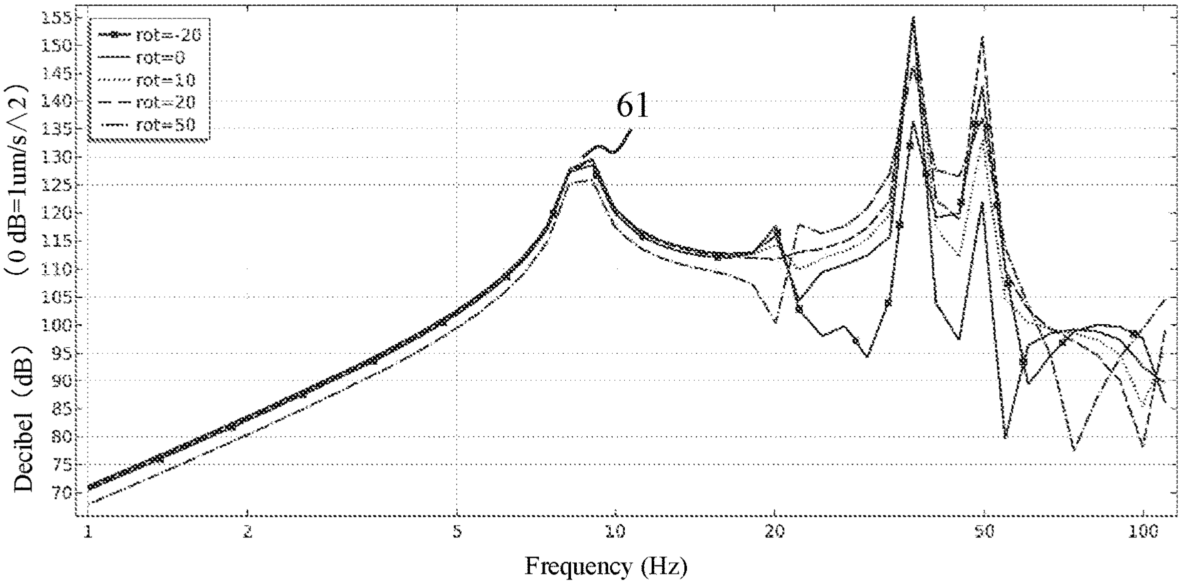
FIG. 6 is a graph illustrating frequency response curves of an output assembly under different first angle parameters according to some embodiments of the present disclosure.

FIG. 6 is a graph illustrating frequency response curves of the output assembly under different first angle parameters according to some embodiments of the present disclosure. As shown in FIG. 6, as the angle $\theta_m$ corresponding to the first angle parameter increases from −20° to 20°, with an increasing of the angle $\theta_m$, the frequency response curve corresponding to the output assembly in a specific frequency band (e.g., in the range of 8 Hz-40 Hz) after a first resonant peak 61 becomes flatter gradually. When the angle $\theta_m$ increases to 50°, the frequency response curve of the specific frequency band after the first resonant peak 61 has a clear resonant valley, and the frequency response curves are flatter compared to the frequency response curve when the angle $\theta_m$ is −20°. To make the frequency response curve of the acoustic output device flatter in the low-frequency band and improve the sound quality of the acoustic output device, in some embodiments, the angle $\theta_m$ may be in a range of 0°-50°. For example, the angle $\theta_m$ may be in a range of 0°-40°. As another example, the angle $\theta_m$ may be in a range of 10°-30°. As another example, the angle $\theta_m$ may be in a range of 15°-25°.

Figure 7A:
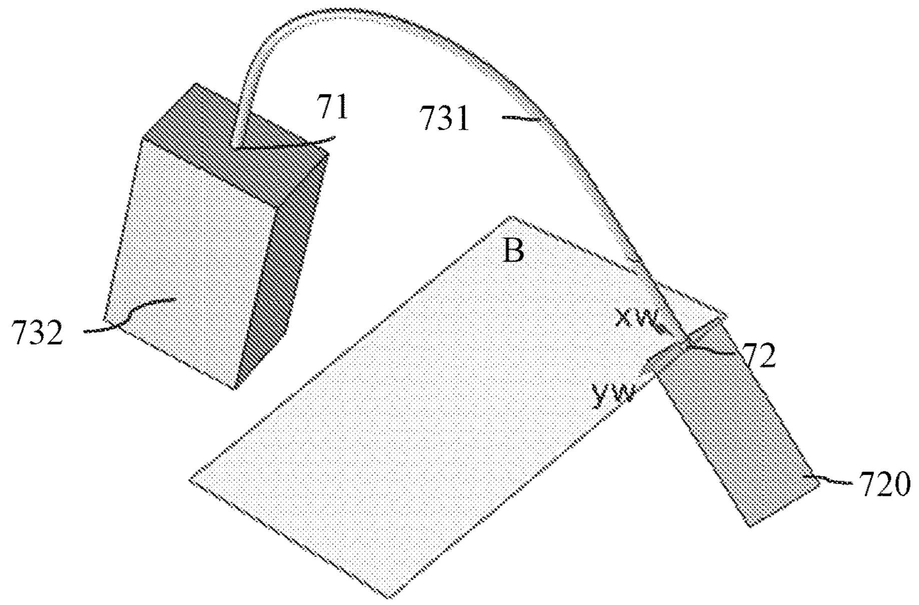
FIG. 7A is a schematic diagram illustrating a connection surface through which an ear hook is connected to a first piezoelectric element according to some embodiments of the present disclosure.
Figure 7B:
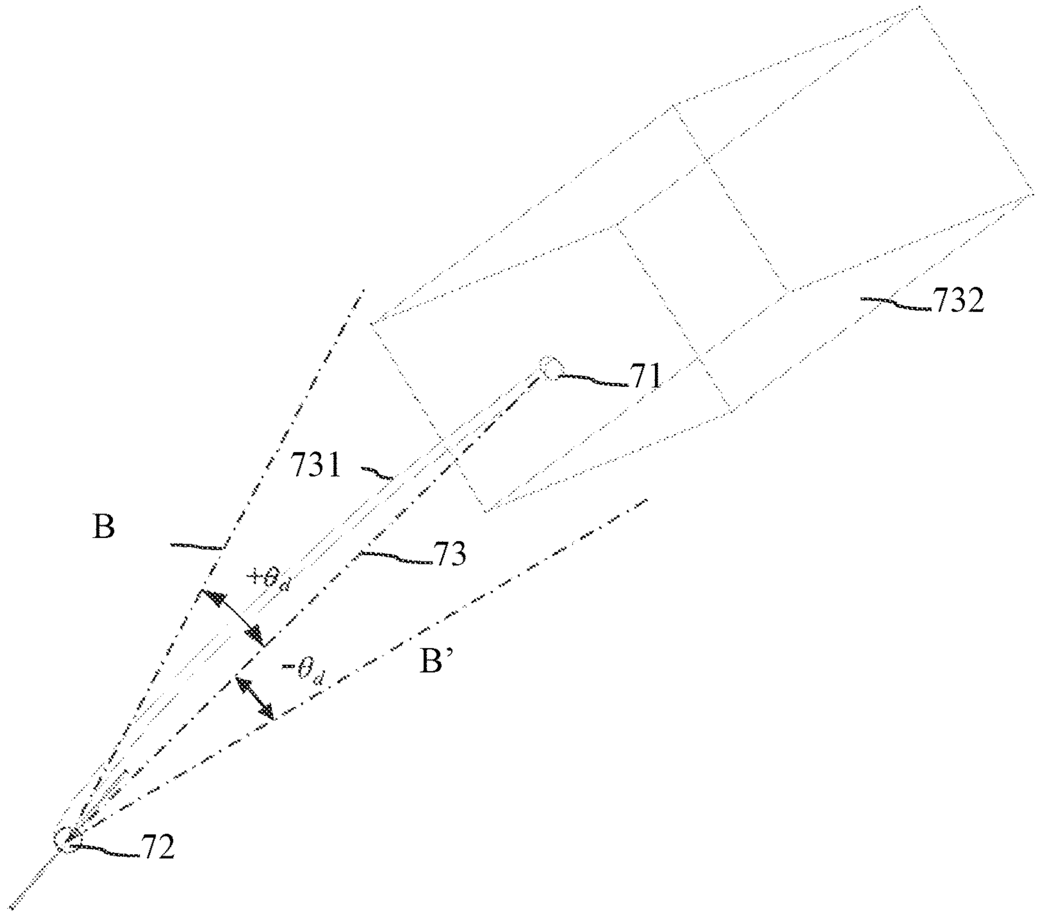
FIG. 7B is a schematic diagram illustrating a projection of a partial structure of an acoustic output device on a connection surface through which an ear hook is connected to a first piezoelectric element according to some embodiments of the present disclosure.

FIG. 7A is a schematic diagram illustrating a connection surface through which the ear hook is connected to a first piezoelectric element according to some embodiments of the present disclosure. FIG. 7B is a schematic diagram illustrating a projection of the partial structure of the acoustic output device on a connection surface through which the ear hook is connected to the first piezoelectric element according to some embodiments of the present disclosure. As shown in FIG. 7A, one end of an ear hook 731 is connected to an output assembly 732. A first piezoelectric element 720 is connected to the other end of the ear hook 731 and has a second connection surface B. A connection point 72 between the first piezoelectric element 720 and the ear hook 731 is on the second connection surface B (a plane defined by axes xw and yw in FIG. 7A). As shown in FIG. 7B, a line connecting connection point 71 and connection point 72 is defined as a second line 73, and an angle $\theta_d$ between the second line 73 and the second connection surface B may be regarded as the second angle parameter. It should be noted that the second connection surface B may be approximately regarded as the end face of the ear hook 72 through which the ear hook 72 is connected to the first piezoelectric element 720.

Figure 8:
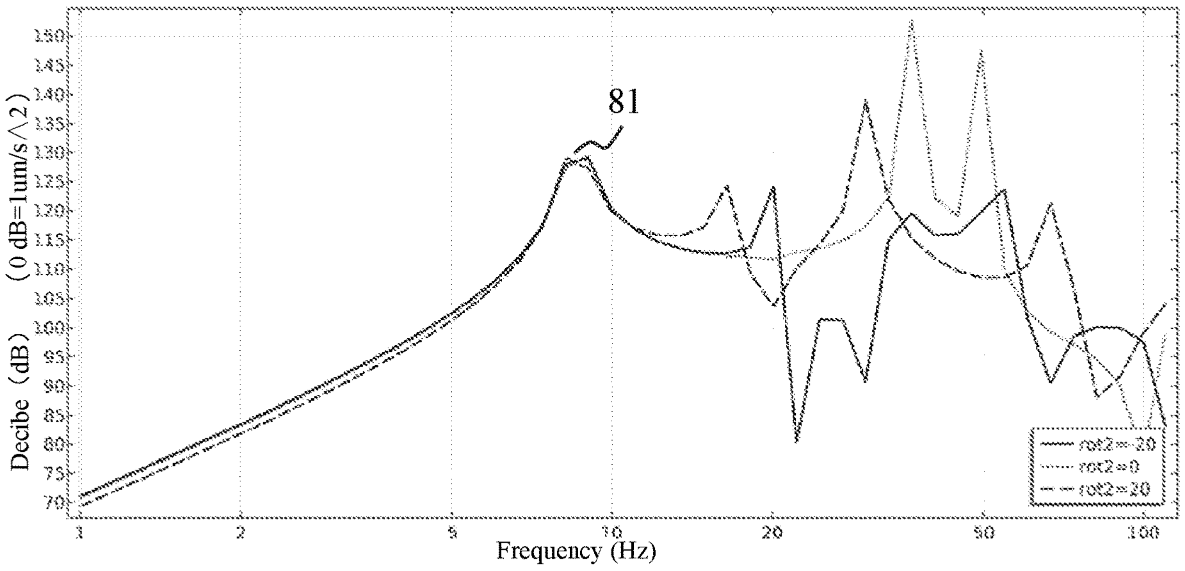
FIG. 8 is a graph illustrating frequency response curves of an output assembly under different second angle parameters according to some embodiments of the present disclosure.

FIG. 8 is a graph illustrating frequency response curves of the output assembly under different second angle parameters according to some embodiments of the present disclosure. As shown in FIG. 8, when the angle $\theta_d$ increases from −20° to 0°, the frequency response curve corresponding to the output assembly in a specific frequency band (e.g., in a range of 8 Hz-100 Hz) after a first resonant peak 81 becomes flatter gradually. When the included angle $\theta_d$ continues to increase to 20°, the corresponding frequency response curve of the output assembly in the specific frequency band after the first resonant peak 81 is flatter than the frequency response curve corresponding to the included angle $\theta_d$ of −20°, but is bumpier than the frequency response curve corresponding to the second angle parameter of 0°. To make the frequency response curve of the acoustic output device relatively flat in a low-frequency band and improve the sound quality of the acoustic output device, in some embodiments, the included angle $\theta_d$ may be in a range of −20°-20°. In some embodiments, the angle $\theta_d$ may be in a range of −10°-20°. In some embodiments, the angle $\theta_d$ may be in a range of 0°-10°. In some embodiments, the angle $\theta_d$ may be in a range of 0°-5°. It should be noted that the positive and negative values of the above included angles $\theta_d$ refer to different directions of the second connection surface relative to the second line 73. For example, the included angle between the second connection surface B and the second line 73 in FIG. 7B (+$\theta_d$) is positive, and the included angle between the second connection surface B' and the second line 73 in FIG. 7B (−$\theta_d$) is negative. In some embodiments, the second angle parameter $\theta_d$ may be adjusted by adjusting a structure or a position of the first piezoelectric element 720 or the ear hook 731.

In some embodiments, the acoustic output device may include a second piezoelectric element connected to the fixing structure. The second piezoelectric element may be configured to generate a voltage in response to a deformation of the fixing structure. The second piezoelectric element may be a device whose voltage is positively correlated with its deformation degree. For example, the larger the deformation degree of the second piezoelectric element, the greater the voltage the second piezoelectric element may generate. That is, in some embodiments, the second piezoelectric element may be attached to a surface of the fixing structure and disposed along an extension direction of the fixing structure. For example, when the fixing structure includes an elastic metal wire and an elastic sleeve that covers the elastic metal wire, the second piezoelectric element may be attached to the elastic metal wire and covered by the elastic sleeve. As another example, the second piezoelectric element may be attached to the surface of the elastic sleeve. In some embodiments, the second piezoelectric element may generate the voltage after the deformation driven by the fixing structure. The second piezoelectric element may also generate the deformation after receiving the driving voltage to adjust the shape of the fixing structure such that a clamping force between the fixing structure and a user body may be adjusted. In some embodiments, the second piezoelectric element may be made of a piezoelectric material that may generate the voltage based on the deformation. Exemplary piezoelectric materials may include piezoelectric ceramics, piezoelectric crystals, piezoelectric polymers (e.g., vinylidene fluoride), etc., or any combination thereof. In some embodiments, the second piezoelectric element may have any shape, such as a sheet, a block, a column, a ring structure, etc., or any combination thereof. In some embodiments, the acoustic output device may include a plurality of second piezoelectric elements to achieve multiple shape adjustments of the fixing structure.

In some embodiments, a function of the second piezoelectric element may be implemented by a single piezoelectric element. For example, the single second piezoelectric element may generate the voltage in response to the deformation of the fixing structure. And the single second piezoelectric element may deform based on the driving voltage to adjust the shape of the fixing structure. In some embodiments, when the second piezoelectric element is the single piezoelectric element, to improve a sensitivity of the second piezoelectric element to the deformation of the fixing structure, the second piezoelectric element may be located on the fixing structure at the position farthest away from the output assembly. For example, when the fixing structure is a rear hook shown in FIG. 2, the second piezoelectric element may be located on the fixing structure near the rear side of the user's head. In some embodiments, the single second piezoelectric element may generate the voltage in response to the deformation of the fixing structure. The processor of the acoustic output device may receive the voltage and, in response to that the voltage is not within a preset voltage range, output a control signal for generating a driving voltage applied to the second piezoelectric element to adjust the shape of the fixing structure. In such cases, the fixing structure with the shape adjusted by the second piezoelectric element may provide a clamping force for the output assembly to fit near the user's ear. To improve the comfort of the user wearing the acoustic output device, the clamping force may be in a range of 0.1 N-0.8 N. In some embodiments, the clamping force may be in a range of 0.2 N-0.6 N. In some embodiments, the clamping force may be in a range of 0.3 N-0.5 N.

In some embodiments, the function of the second piezoelectric element may be implemented by a plurality of piezoelectric elements. In some embodiments, the second piezoelectric element may include a first sub-piezoelectric element and a second sub-piezoelectric element. The first sub-piezoelectric element may generate the voltage in response to the deformation of the fixing structure. The processor of the acoustic output device may receive the voltage and, in response to that the voltage is not in a preset voltage range, output the control signal for generating the driving voltage applied to the second sub-piezoelectric element. In such cases, the shape of the fixing structure may be adjusted such that the adjusted fixing structure may provide a clamping force for the output assembly to fit near the user's ear. In some embodiments, to improve the sensitivity of the first sub-piezoelectric element to the fixing structure, the first sub-piezoelectric element may be located on the fixing structure at a position farthest from r the output assembly. For example, the first sub-piezoelectric element may be located on the fixing structure near the rear side of the user's head. In some embodiments, the second sub-piezoelectric element may be located between the first sub-piezoelectric element and the ear hook on the fixing structure such that the shape of the fixing structure may be adjusted to a greater extent. In some embodiments, to adjust shapes of a plurality portions of the fixing structure, the second piezoelectric element may include a first sub-piezoelectric element and a plurality of second sub-piezoelectric elements. The first sub-piezoelectric element may be located on the fixing structure at a position farthest from the output assembly. The plurality of second sub-piezoelectric elements may be disposed symmetrically relative to the first sub-piezoelectric element.

The processor may interact with the second piezoelectric element. In some embodiments, when the user wears the acoustic output device, the second piezoelectric element may deform in response to the deformation of the fixing structure, the second piezoelectric element may generate a voltage, and the processor may receive the voltage generated by the second piezoelectric element and determine whether the received voltage is within the preset voltage range. The voltage being within the preset voltage range may represent that the deformation of the second piezoelectric element is within a preset deformation range, that is, the clamping force between the fixing structure and the user's body is appropriate, and the clamping force at this time is not too loose or too tight for the user or the application scenario in which the user is located. The voltage being not within the preset voltage range may represent that the clamping force at this time is too loose or too tight for the user. The processor may output a control signal for generate a driving voltage applied to the second piezoelectric element to adjust the shape of the fixing structure such that the adjusted shape of the fixing structure may provide a clamping force for the output assembly to fit near the ear of the user, which may improve comfort of the user wearing the acoustic output device. Details regarding the second piezoelectric element and the processor adjusting the shape of the fixing structure may be found in FIG. 9-FIG. 19 and related descriptions thereof.

Figure 9:
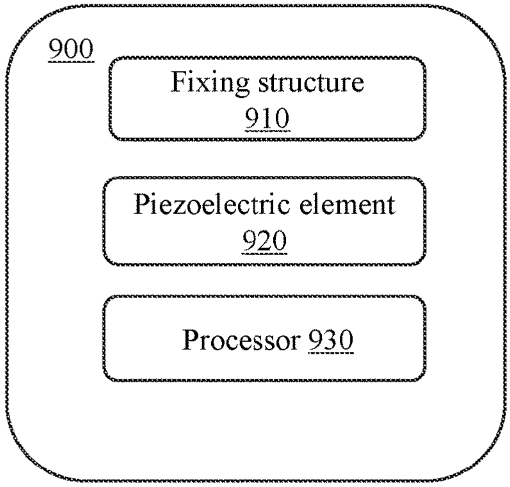
FIG. 9 is a block diagram illustrating an exemplary wearable device according to some embodiments of the present disclosure.

FIG. 9 is a block diagram illustrating an exemplary wearable device according to some embodiments of the present disclosure. As shown in FIG. 9, a wearable device 900 may include a fixing structure 910, a piezoelectric element 920, and a processor 930.

The wearable device 900 may be a device that may be worn by a user. In some embodiments, the wearable device 900 may be worn on a body part such as the user's head, hand, etc. In some embodiments, the wearable device 900 may include glasses, smart bracelets, headphones, hearing aids, smart helmets, smart watches, smart clothing, smart backpacks, smart accessories, etc., or any combination thereof. For example, the wearable device 900 may be functional nearsighted glasses, presbyopic glasses, cycling glasses, or sunglasses, etc., or may be an intelligent eyewear, such as audio glasses with a headphone function. In some embodiments, the wearable device 900 may also be a headset, such as a helmet, an augmented reality (AR) device, or a virtual reality (VR) device. In some embodiments, the AR device or the VR device may include a VR headset, VR glasses, AR headset, AR glasses, etc., or any combination thereof. For example, the VR devices and/or the AR devices may include Google Glass, Oculus Rift, Hololens, Gear VR, etc.

The fixing structure 910 may be a structure to be placed on the user's body. In some embodiments, the fixing structure 910 may be placed to a body part of the user. Exemplary body parts may include the head, hands, legs, waist, back, etc. In some embodiments, when the user wears the wearable device 900, the fixing structure 910 may be in contact with the user's body part and deform. The structure of the fixing structure 910 may be related to a type of wearable device 900. Different types of wearable devices 900 may have different fixing structures 910. For example, when the wearable device 900 is a rear-hook headset, the fixing structure 910 may be a rear hook with a curved shape that fits the rear side of the user's head. For example, when the wearable device 900 is a headset, the fixing structure 910 may be a curved head structure that fits the top of the user's head. As another example, if the wearable device 900 is a bone-conduction headset or hearing aid, the fixing structure

910 may be an ear hook for hanging on the user's ear with a curved part adapted to the human ear. As another example, when the wearable device 900 is an AR or VR eyewear, the fixing structure 910 may be a frame structure with nose pads and temples on both sides that may be worn on the user's face and ears. As another example, when the wearable device 900 is a smart bracelet, the fixing structure 910 may be a band structure worn on the user's arm. Taking the rear-hook as an example, the fixing structure 910 may be a rear hook. The fixing structure 910 may surround the user's head to achieve a fixation, and the fixing structure 910 may provide a clamping force for the rear-hook headset to fit near the user's ear. More descriptions of the fixing structure may be found elsewhere in the present disclosure, such as FIG. 16-FIG. 19 and related descriptions thereof.

The piezoelectric element 920 may be a device whose voltage is relative to the deformation degree. Specifically, utilizing a forward/inverse piezoelectric effect of the piezoelectric element 920, the piezoelectric element 920 may generate a voltage after a deformation driven by the fixing structure 910. The piezoelectric element 920 may also receive the driving voltage and generate a deformation to adjust the shape of the fixing structure 910, thereby adjusting the clamping force between the fixing structure 910 and the user's body. In some embodiments, the piezoelectric element 920 may be disposed along an extension direction of the fixing structure 910. In some embodiments, the piezoelectric element 920 may be made of a piezoelectric material that generates the voltage based on the deformation. Exemplary piezoelectric materials may include piezoelectric ceramics, piezoelectric crystals, piezoelectric polymers (e.g., biased polyvinyl fluoride), etc., or any combination thereof. In some embodiments, the piezoelectric element 920 may have any shape, such as a sheet, a block, a column, a ring structure, etc., or any combination thereof. In some embodiments, the piezoelectric element 920 may be a sheet structure. In some embodiments, the wearable device 900 may include a plurality of piezoelectric elements 920 to adjust the clamping force between the fixing structure and the user's body at a plurality of positions.

In some embodiments, the piezoelectric element 920 may include a piezoelectric layer that generates the voltage based on the deformation. Due to the inverse piezoelectric effect of the piezoelectric layer, when a deformation pressure is applied to the piezoelectric layer, the piezoelectric layer may generate the voltage accordingly. Specifically, the piezoelectric layer may be made of the piezoelectric material. In some embodiments, the piezoelectric element 920 may include a piezoelectric layer and a substrate layer, the piezoelectric layer, and the substrate layer may extend along a length direction of the piezoelectric element 920 and overlap in a thickness direction of the piezoelectric element 920. The material of the substrate layer may include, but is not limited to, metals and alloys, glass fibers, carbon fibers, etc., or any combination thereof. In some embodiments, the piezoelectric element 920 may include two piezoelectric layers and a substrate layer. The two piezoelectric layers may be physically fixed to upper and lower surfaces of the substrate layer, respectively, through attachment, etc. More descriptions of the piezoelectric element may be found in other parts of the present disclosure, such as FIG. 16-FIG. 19 and related descriptions thereof.

The function of the piezoelectric element 920 may be implemented by one piezoelectric element. The piezoelectric element 920 may be deformed when driven by the fixing structure 910 and generate the voltage. In response to a control signal from the processor 930, the voltage generated by the piezoelectric element 920 may be within a preset voltage range to adjust the shape of the fixing structure 910, thereby adjusting the clamping force between the fixing structure 910 and the user's body. In some embodiments, the wearable device may include a plurality of piezoelectric elements to enable the adjustment of the shape of the fixing structure at a plurality of positions.

The function of the piezoelectric element 920 may be implemented by a plurality of piezoelectric elements. In some embodiments, the piezoelectric element 920 may include a first sub-piezoelectric element and a second sub-piezoelectric element, and the first sub-piezoelectric element may be deformed when driven by the fixing structure 910 and generate the voltage. The processor 930 may receive the voltage and in response to that the voltage is not within the preset voltage range, output a control signal for generating a driving voltage applied to the second sub-piezoelectric element to adjust the shape of the fixing structure 910, thereby enabling the adjustment of the clamping force between the fixing structure 910 and the user's body, and adjusting the clamping force to a suitable range (e.g., 0.1 N-0.8 N). In some embodiments, the acoustic output device may include a plurality of second sub-piezoelectric elements to enable the adjustment of the shape of the fixing structure at a plurality of positions.

The processor 930 may interact with the piezoelectric elements 920. For example, the processor 930 may process data and/or information obtained from the piezoelectric element 920. As another example, the processor 930 may send data and/or information to the piezoelectric element 920. In some embodiments, the processor 930 may receive the voltage generated by the piezoelectric element 920, and the processor 930, in response to that the voltage is not within a preset voltage range, may output the control signal for generating the driving voltage applied to the piezoelectric element 920 to adjust the shape of the fixing structure. In such cases, the adjusted shape of the fixing structure may provide a clamping force for the output assembly to fit near the user's ear such that the user may wear the acoustic output device comfortably. In some embodiments, the processor 930 may be local or remote. In some embodiments, the processor 930 may be implemented on a cloud platform. For example, the cloud platform may include a private cloud, a public cloud, a hybrid cloud, a community cloud, a distributed cloud, an inter-cloud, a multi-cloud, or any combination thereof. In some embodiments, the processor 930 may include one or more processors (e.g., a single-chip processor or a multi-chip processor). In some embodiments, the processor 930 may be a standalone device. In some embodiments, processor 930 may be a component of a terminal device (e.g., VR glasses) or a client device (e.g., a cell phone, a tablet, a laptop, etc.). For example, the processor 930 may be integrated into the terminal device or the client device.

Figure 10:
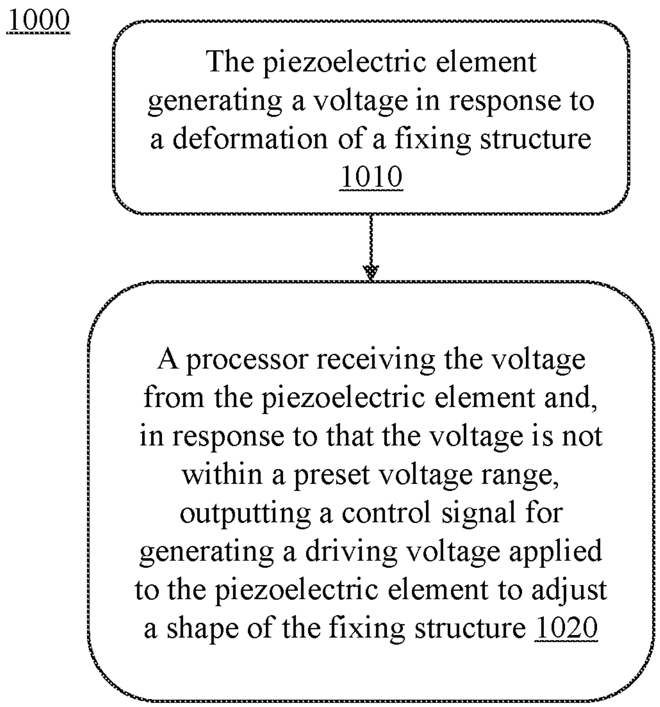
FIG. 10 is a flow chart illustrating a process for controlling a deformation of a fixing structure using a single piezoelectric element according to some embodiments of the present disclosure.

The function of the piezoelectric element may be implemented by a single piezoelectric element. The process for controlling the deformation of the fixing structure using the single piezoelectric element is shown in FIG. 10. FIG. 10 is a flow chart illustrating a process for controlling a deformation of a fixing structure using a single piezoelectric element according to some embodiments of the present disclosure. As shown in FIG. 10, a process 1000 may include the following operations.

In 1010, the piezoelectric element may generate a voltage in response to a deformation of the fixing structure.

In some embodiments, when a user wears a wearable device, the fixing structure may deform to adapt to the user's body, and the piezoelectric element on the fixing structure may be driven to deform. A piezoelectric layer of the piezoelectric element may have a piezoelectric effect, and when a force is applied to the piezoelectric element and causes the deformation, the piezoelectric element may generate the voltage accordingly. In some embodiments, the voltage generated by the deformed piezoelectric element may correspond to a deformation degree of the piezoelectric element. For example, the greater the deformation degree of the piezoelectric element, the greater the voltage. In some embodiments, the piezoelectric element may generate a voltage signal in a range of 0-100 mV based on the deformation of the fixing structure such that the processor may analyze the clamping force. More descriptions of the piezoelectric element and the fixing structure may be found elsewhere in the present disclosure, such as the relevant descriptions in FIG. 9 and FIG. 16, etc.

In 1020, the processor may receive the voltage from the piezoelectric element, and in response to that the voltage is within a preset voltage range, the processor may output a control signal for generating a driving voltage applied to the piezoelectric element to adjust a shape of the fixing structure. More descriptions of the processor may be found elsewhere in the present disclosure, such as the relevant descriptions in FIG. 9, etc.

In some embodiments, the processor may further determine whether the voltage is within the preset voltage range before responding to that the voltage is not within the preset voltage range. The preset voltage range may be a range of the output voltage of the piezoelectric element when the fixing structure deforms and provides a suitable clamping force (e.g., 0.1 N-0.8 N). In some embodiments, the preset voltage range may be input by the user based on their own wearing experience or may be data pre-stored in a memory unit in the processor. The preset voltage range may be adjusted according to different types and wearing positions of the wearable device, and different user groups.

Specifically, the voltage being within the preset voltage range may indicate that the clamping force between the fixing structure and the user's body is appropriate, and that the clamping force is not too loose or too tight for the user or the application scenario in which the user is placed. If the voltage is within the preset voltage range, the processor may not output the control signal.

If the voltage is not within the preset voltage range, the processor may output the control signal for generating a driving voltage applied to the piezoelectric element, the driving voltage may be a voltage for driving the piezoelectric element to deform. The driving voltage may be generated by a processor control circuit or an electronic element and may be applied to the piezoelectric element. The piezoelectric element may adjust the deformation thereof after receiving the driving voltage due to the inverse piezoelectric effect, and then drive the fixing structure to adjust the deformation of the fixing structure to adjust the shape of the fixing structure.

In some embodiments, the piezoelectric element may adjust the deformation thereof after receiving the driving voltage, and the fixing structure connected to the piezoelectric element may adjust the deformation thereof correspondingly, i.e., the shape of the fixing structure may be adjusted. In some embodiments, the adjustment of the shape of the fixing structure may provide the clamping force for the output assembly to fit near the user's ear. To improve the comfort of the user wearing the wearable device, in some embodiments, the clamping force may be in a range of 0.1 N-0.8 N. In some embodiments, the clamping force may be in a range of 0.2 N-0.6 N. In some embodiments, the clamping force may be in a range of 0.3 N-0.5 N.

Specifically, if the voltage is not within the preset voltage range, the clamping force of the fixing structure on the user may be too loose or too tight. The processor may output the control signal to the piezoelectric element, the control signal may be applied to the piezoelectric element, and the piezoelectric element may change the deformation thereof (e.g., a magnitude of the deformation degree or a direction of the deformation) in response to the driving voltage. In some embodiments, the piezoelectric element may increase or decrease the deformation in response to the driving voltage. In some embodiments, the piezoelectric element may deform in response to the driving voltage in a direction close to or far away from the user's body. When the piezoelectric element deforms in a direction close to the user's body, the piezoelectric element may provide an additional clamping force and the clamping force between the fixing structure and the user's body may be increased; and when the piezoelectric element deforms in a direction far away from the user's body, the clamping force between the fixing structure and the user's body may decrease.

It should be noted that the above description of the process 1000 is for illustration purposes only and does not limit the scope of the present disclosure. For those skilled in the art, various amendments and changes may be made to the process 1000 under the guidance of the present disclosure. However, these amendments and changes remain within the scope of the present disclosure. For example, the operation 1020 may be divided into multiple operations.

Figure 11:
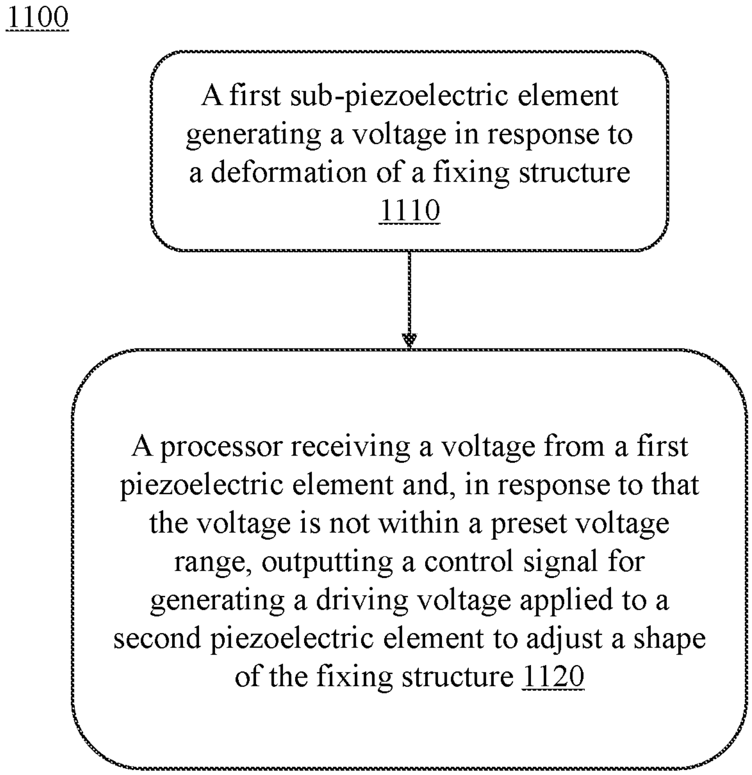
FIG. 11 is a flow chart illustrating a process for controlling a deformation of a fixing structure using a plurality of piezoelectric elements according to some embodiments of the present disclosure.

In some embodiments, the function of the piezoelectric element may be implemented by a plurality of piezoelectric elements. A process for controlling the deformation of the fixing structure using the plurality of piezoelectric elements is shown in FIG. 11. FIG. 11 is a flow chart illustrating a process for controlling the deformation of the fixing structure using a plurality of piezoelectric elements according to some embodiments of the present disclosure. As shown in FIG. 11, a process 1100 may include the following operations.

In 1110, a first sub-piezoelectric element may generate a voltage in response to the deformation of the fixing structure. The first sub-piezoelectric element described in operation 1110 may be similar to the piezoelectric element described in operation 1010, and a specific description of the operation 1110 may be found in operation 1010 on FIG. 10, which is not repeated here.

In 1120, the processor may receive a voltage from the first piezoelectric element and, in response to that the voltage is not within a preset voltage range, the processor may output a control signal for generating a driving voltage applied to the second piezoelectric element to adjust a shape of the fixing structure.

In some embodiments, before responding to that the voltage is not within the preset voltage range, the processor may determine whether the voltage is within the preset voltage range. If the voltage is within the preset voltage range, the processor may not output the control signal.

If the voltage is not within the preset voltage range, the processor may output the control signal for generating the driving voltage applied to the second piezoelectric element, and the deformation of the second piezoelectric element may be adjusted due to the inverse piezoelectric effect of the second piezoelectric element after the second piezoelectric element receives the driving voltage. The deformation of the fixing structure connected to the second piezoelectric element may be adjusted correspondingly, i.e., the shape of the fixing structure may be adjusted. In some embodiments, the adjustment of the shape of the fixing structure may provide a clamping force for the output assembly to fit near the user's ear. Specifically, the first sub-piezoelectric element may detect the deformation of the fixing structure based on the voltage generated by the first sub-piezoelectric element, and the second sub-piezoelectric element may adjust the shape of the fixing structure in response to the driving voltage. The driving voltage may be generated based on the control signal sent by the processor.

It should be noted that the above description of the process 1100 is for illustration purposes only and does not limit the scope of application of the present disclosure. For those skilled in the art, various amendments and changes may be made to the process 1100 under the guidance of the present disclosure. However, these amendments and changes remain within the scope of the present disclosure. For example, the operation 1120 may be divided into multiple operations.

Figure 12:
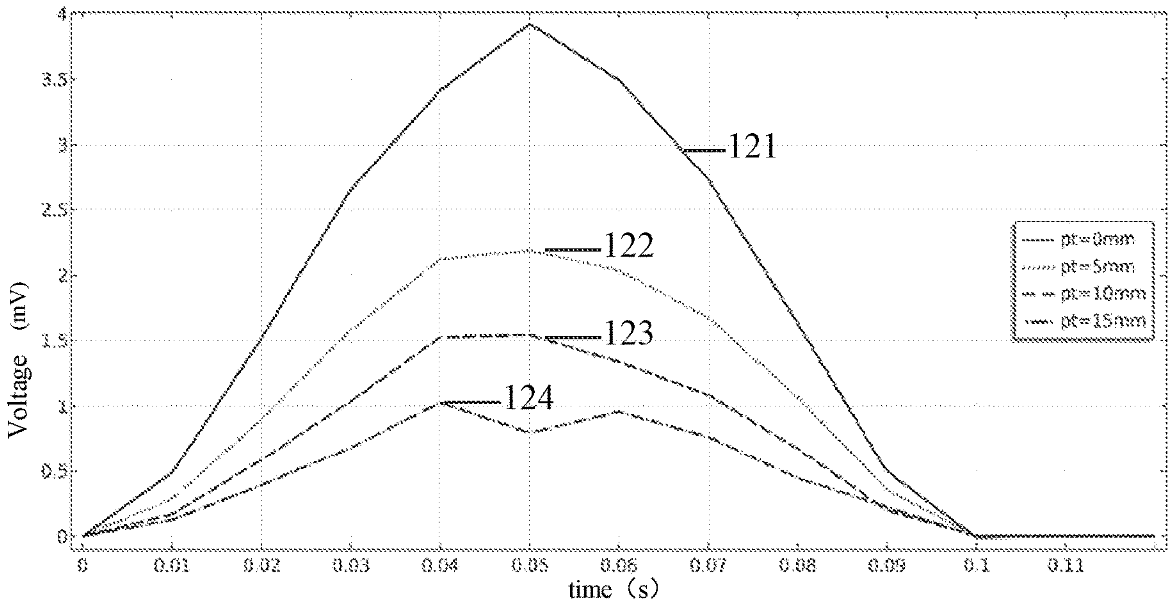
FIG. 12 is a graph illustrating voltages output by a piezoelectric element at different positions according to some embodiments of the present disclosure.

In some embodiments, to improve a sensitivity of the piezoelectric element to the deformation of the fixing structure, the piezoelectric element may be located at a position where the fixing structure has a maximum deformation stress. FIG. 12 is a graph illustrating voltages output by the piezoelectric element at different positions according to some embodiments of the present disclosure. In FIG. 12, pt represents a distance between the piezoelectric element and the position on the fixing structure with the maximum deformation stress. As used herein, the fixing structure is a rear hook shown in FIG. 2 or FIG. 16. When the fixing structure is the rear hook, the position with the maximum deformation stress may be at a midpoint of the rear hook. As shown in FIG. 12, curves 121, 122, 123, and 124 represent the voltages output by the piezoelectric element when the distance between the piezoelectric element and the position with the maximum deformation stress on the fixing structure is 0 mm, 5 mm, 10 mm, and 15 mm, respectively. According to FIG. 12, the closer the piezoelectric element is to the position on the fixing structure with the maximum deformation stress, the greater the voltage output from the piezoelectric element or the first sub-piezoelectric element. In some embodiments, to make the voltage output from the piezoelectric element or the first sub-piezoelectric element greater to meet the requirements of a required input of the processor, the piezoelectric element may be disposed on the fixing structure at a position with a large deformation stress. For example, when the fixing structure is a rear hook, the piezoelectric element may be located at or near the center of the rear hook. As another example, when the fixing structure is a headset, the piezoelectric element may be located at or near the center of the headset. As another example, when the fixing structure is a temple, the piezoelectric element may be located at a position of the temple near the user's ear.

Figure 13:
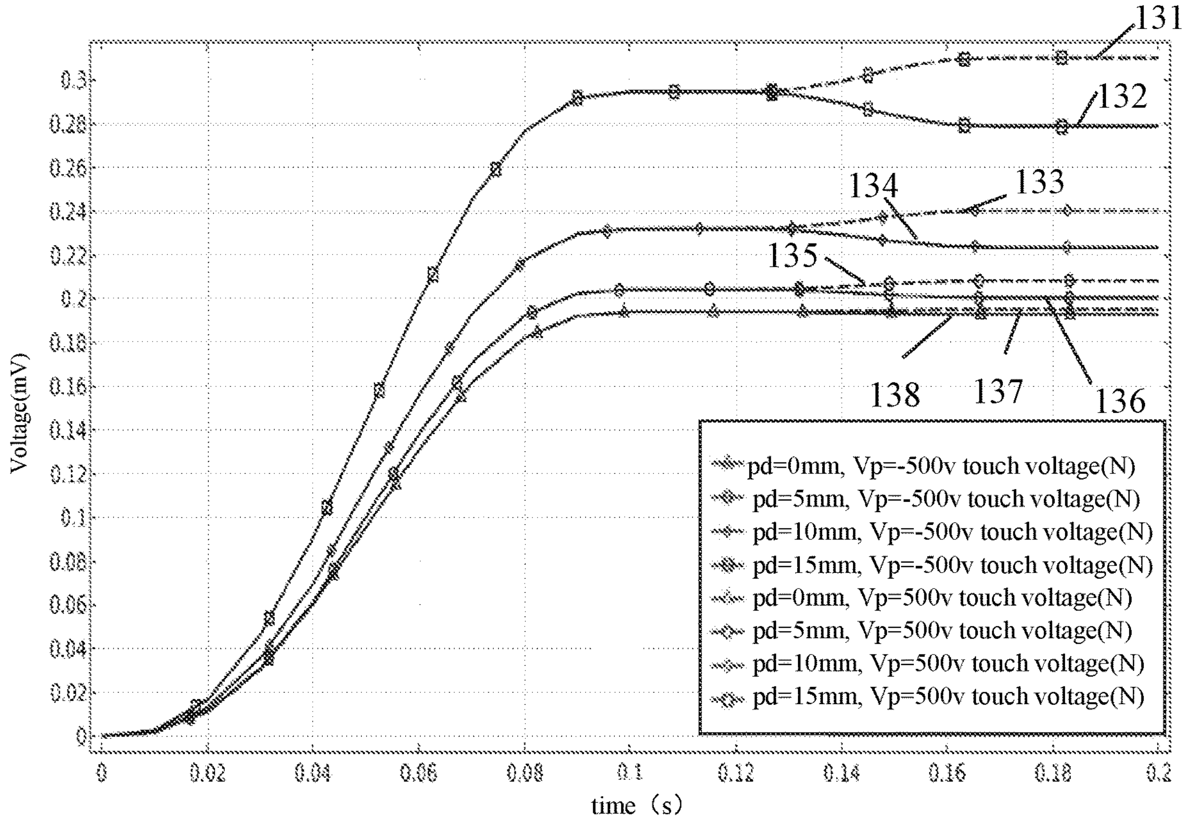
FIG. 13 is a graph illustrating clamping forces when a piezoelectric element is at different positions according to some embodiments of the present disclosure.

FIG. 13 is a graph illustrating clamping forces when the piezoelectric element is at different positions according to some embodiments of the present disclosure. In FIG. 13, pd represents a distance between the piezoelectric element and an end of a fixing structure (e.g., the end of a rear hook). As shown in FIG. 13, curves 131, 133, 135, and 137 represent the clamping forces adjusted by the piezoelectric element in a time period in response to a positive driving voltage (based on the control signal sent by the processor, the piezoelectric element responds to the positive driving voltage, and the positive driving voltage is used to increases the clamping force of the fixing structure on the user) when the distance between the piezoelectric element and the end of the fixing structure is 15 mm, 10 mm, 5 mm, and 0 mm, respectively. Curves 132, 134, 136, and 138 represent the clamping forces adjusted by the piezoelectric element in a time period in response to a negative driving voltage equal to the positive driving voltage (based on the control signal sent by the processor, the piezoelectric element responds to the negative driving voltage, and the negative driving voltage is used to decreases the clamping force of the fixing structure on the user) when the distance between the piezoelectric element and the end of the fixing structure is 15 mm, 10 mm, 5 mm, and 0 mm, respectively. According to FIG. 13, the farther the piezoelectric element is from the end of the fixing structure, that is, the closer the piezoelectric element is to the position on the fixing structure with the maximum deformation stress, the greater the clamping force of the fixing structure. In addition, the farther the piezoelectric element is from the end of the fixing structure, in response to the opposite driving voltages with a same value, the greater the adjustment range of the clamping force of the fixing structure. In some embodiments, to enable the piezoelectric element to adjust the clamping force of the fixing structure to a greater extent, the piezoelectric element may be disposed on the fixing structure at a position with a large deformation stress. For example, the piezoelectric element may be located in an intermediate region that has the same distance to both ends of the fixing structure. In some embodiments, when the piezoelectric element includes a first sub-piezoelectric element for generating the voltage and a second sub-piezoelectric element for adjusting the shape of the fixing structure, the second sub-piezoelectric element may be located on a side of the fixing structure away from the first sub-piezoelectric element, or the second piezoelectric element may be located close to the first sub-piezoelectric element, thereby increasing the ability of the second sub-piezoelectric element to adjust the shape of the fixing structure.

Figure 14:
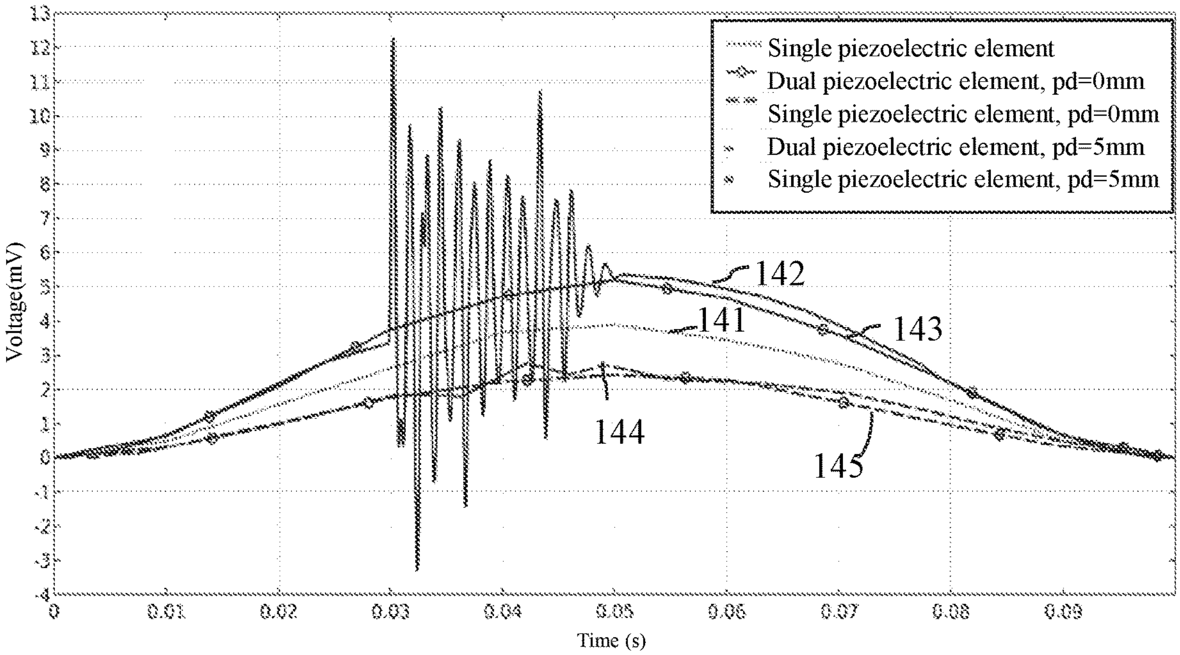
FIG. 14 is a graph illustrating voltages output by a piezoelectric element according to some embodiments of the present disclosure.

In some embodiments, the piezoelectric element may be a single piezoelectric element to improve a sensitivity of the piezoelectric element to the deformation of the fixing structure and to improve the ability of the piezoelectric element to adjust the shape of the fixing structure. FIG. 14 is a graph illustrating voltages output by the piezoelectric element according to some embodiments of the present disclosure. As shown in FIG. 14, a curve 141 represents the voltage output by a single piezoelectric element under an excitation force, and curves 142 and 143 respectively represent the voltages output by the single piezoelectric element and a first sub-piezoelectric element of a dual piezoelectric element attached to the fixing structure under the same excitation force, wherein both the single piezoelectric element and the first sub-piezoelectric element are at a distance of 5 mm from the end of the fixing structure (the rear hook).

Curves 144 and 145 respectively represent the voltages output by the single piezoelectric element and a first sub-piezoelectric element of a dual piezoelectric element attached to a fixing structure under the same excitation force, wherein both the single piezoelectric element and the first sub-piezoelectric element are at a distance of 0 mm from the end of the fixing structure. According to FIG. 14, the closer the piezoelectric element or the first sub-piezoelectric element is to the end of the fixing structure, the smaller the output voltage of the piezoelectric element or the first sub-piezoelectric element. In addition, the single piezoelectric element outputs a greater voltage than the first sub-piezoelectric element in the dual piezoelectric element. In some embodiments, the piezoelectric element may be a single piezoelectric element to enable the piezoelectric element to output a greater voltage to meet the requirements of the required input to the processor.

Figure 15:
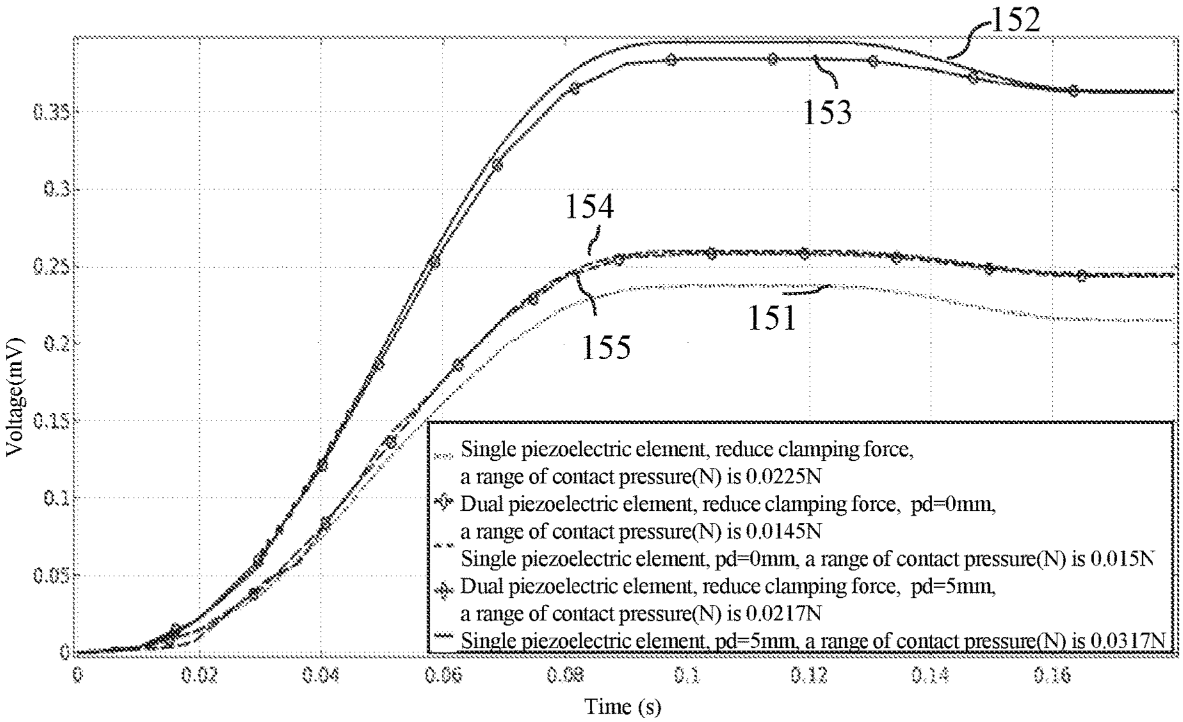
FIG. 15 is a graph illustrating clamping forces adjusted by a second sub-piezoelectric element in a dual piezoelectric element and a single piezoelectric element according to some embodiments of the present disclosure.

FIG. 15 is a graph illustrating clamping forces adjusted by a second sub-piezoelectric element in the dual piezoelectric element and a single piezoelectric element according to some embodiments of the present disclosure. As shown in FIG. 15, a curve 151 represents a clamping force adjusted by the single piezoelectric element under the driving voltage, and curves 152 and 153 respectively represent the clamping force adjusted by the single piezoelectric element and the second sub-piezoelectric element in the dual piezoelectric element connected to the fixing structure under the same driving force, wherein both the single piezoelectric element and the second sub-piezoelectric element are at a distance of 5 mm from the end of the fixing structure (the end of the rear hook). Curves 154 and 155 respectively represent the clamping force adjusted by the single piezoelectric element and the second sub-piezoelectric element in the dual piezoelectric element connected to a fixing structure under the same driving force, wherein both the single piezoelectric element and the second sub-piezoelectric element are at a distance of 0 mm from the end of the fixing structure. According to FIG. 15, the closer the single piezoelectric element or the second sub-piezoelectric element is to the end of the fixing structure, the smaller the clamping force adjusted by the single piezoelectric element or the first sub-piezoelectric element. In addition, the clamping force adjusted by the single piezoelectric element is greater than that of the second sub-piezoelectric element in the dual piezoelectric element. In some embodiments, the piezoelectric element may be the single piezoelectric element such that the clamping force of the fixing structure may be adjusted to a greater extent.

Figure 16:
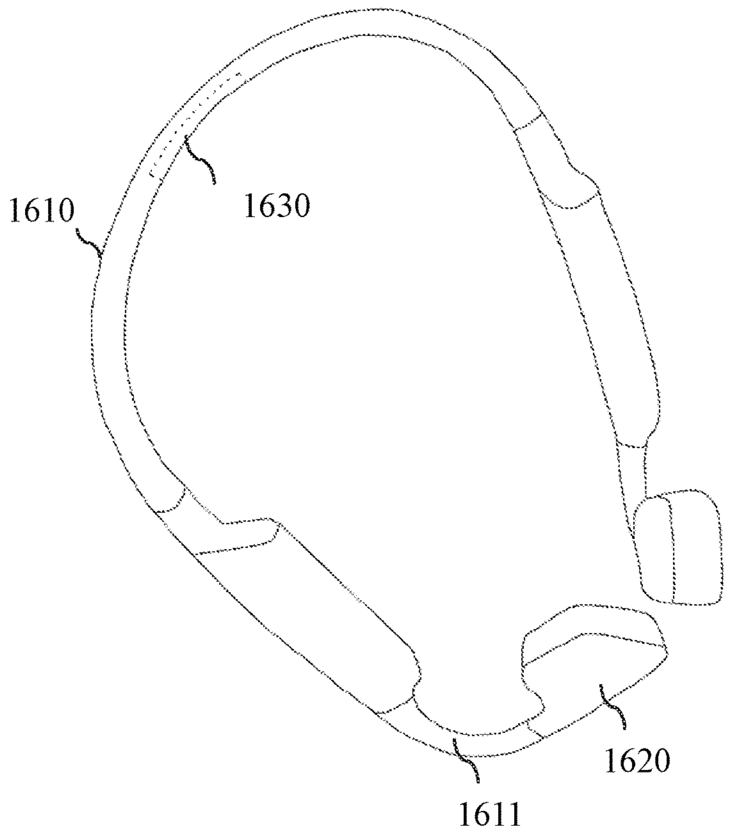
FIG. 16 is a schematic diagram illustrating a structure of an exemplary rear-hook headset according to some embodiments of the present disclosure.

FIG. 16 is a schematic diagram illustrating a structure of an exemplary rear-hook headset according to some embodiments of the present disclosure. As shown in FIG. 16, a wearable device may be a rear-hook headset. In some embodiments, the wearable device may include a fixing structure 1610, a functional element 1620, and a piezoelectric element 1630. The fixing structure 1610 may have a curved shape to fit to the rear side of the user's head. In some embodiments, the fixing structure 1610 may include an elastic metal wire and an elastic sleeve that covers the elastic metal wire. Two ends of the fixing structure 1610 are respectively connected to the functional element 1620. The piezoelectric element 1630 may be located on the fixing structure 1610. The connections described in the present disclosure may include bolting, riveting, interference fitting, snapping, bonding, injection molding, welding, magnetic suction, etc., or any combination thereof.

In some embodiments, the functional element 1620 may be a bone-conduction speaker or an air-conduction speaker. In some embodiments, when the user wears the wearable device, the fixing structure 1610 may be suspended at the back of the user's head. The fixing structure 1610 may place the functional element 1620 close to the user's binaural. For example, the functional element 1620 may be located in a facial region in front of the user's auricle. In some embodiments, the functional element 1620 may be placed near the user's ear without blocking the user's ear canal. For example, when the functional element 1620 is the bone-conduction speaker or a hearing aid, a bone-conduction sound wave generated by the bone-conduction speaker or the hearing aid may be transmitted to the user's auditory nerve through bones, blood, muscles, etc. In some embodiments, the fixing structure 1610 may be elastic to adapt to the shape of the rear side of the head of different users or the users' different requirements for a wearing tightness in different application scenarios. The fixing structure 1610 may be deformed in different degrees when different users wear the wearable device. In some embodiments, a bending component 1611 (also known as an ear hook) may be disposed on the fixing structure 1610 near the functional element 1620. The bending component 1611 may have a shape suitable for the human ear. When the user wears the acoustic output device, the bending component 1611 may be suspended on the ear.

In some embodiments, to improve a sensitivity of the piezoelectric element 1630 to the deformation degree of the fixing structure 1610, the piezoelectric element 1630 may be located in a central region of the fixing structure 1610 along an extension direction of the fixing structure 1610, that is, the piezoelectric element 1630 may be located on the fixing structure 1610 at a position farthest from the functional element 1620. When the user wears the wearable device shown in FIG. 16, the piezoelectric element 1630 may be located on the fixing structure 1610 near the rear side of the user's head. The fixing structure 1610 may have a large deformation degree at this position. In some embodiments, the piezoelectric element 1630 may include multiple piezoelectric elements, one of which may be used to generate a voltage in response to the deformation of the fixing structure 1610, and the other piezoelectric elements may be deformed based on the driving voltage to adjust the shape of the fixing structure 1610. For example, the piezoelectric element 1630 may include a first piezoelectric element and a second piezoelectric element, the first piezoelectric element may be located near a central point of the fixing structure 1610 to sense and adjust the shape of the fixing structure 1610, and the second piezoelectric element may be located on the fixing structure 1610 at a position with a certain distance (e.g., 2 cm) from the first piezoelectric element. As another example, the piezoelectric element 1630 may include a first piezoelectric element, a second piezoelectric element, and a third piezoelectric element. The first piezoelectric element may be located near the central point of the fixing structure 1610, and the second piezoelectric element and the third piezoelectric element may be disposed symmetrically about a center line of the fixing structure 1610 so as to control the shape of the fixing structure 1610. In some embodiments, a single piezoelectric element or a plurality of piezoelectric elements may be disposed at the bending component 1611 of the fixing structure 1610. For example, the fixing structure 1610 may be provided with a piezoelectric element that generates the voltage in response to the deformation of the fixing structure. The piezoelectric element disposed at the bending component 1611 may be used to adjust the clamping force of the functional element 1620 on the user's face.

In some embodiments, the fixing structure 1610 may include a processor. When the user wears the wearable device, the piezoelectric element 1630 may deform when driven by the fixing structure 1610. The piezoelectric element 1630 may send a voltage value corresponding to a deformation degree thereof to the processor. The processor may determine whether the received voltage is within a preset voltage range. If the voltage is within the preset voltage range, the clamping force between the fixing structure 1610 and the user's head may be appropriate, and for the user or the user's application scenario, the clamping force is not too loose or too tight. If the voltage is not within the preset voltage range, the clamping force may be too loose or too tight for the user. The processor may output a control signal to the piezoelectric element 1630 for generating a driving voltage applied to the piezoelectric element 1630 to adjust the shape of the fixing structure 1610 such that the fixing structure 1610 may provide the clamping force to fit the user's ear. In some embodiments, the deformation of the piezoelectric element 1630 may be adjusted (e.g., a magnitude of the deformation degree or a direction of the deformation) in response to the driving voltage. In some embodiments, in response to the driving voltage, the deformation degree of the piezoelectric element 1630 may be increased. In some embodiments, the piezoelectric element 1630 may deform toward or away from the user's body in response to the driving voltage. When the piezoelectric element 1630 deforms toward the user's body, the piezoelectric element 1630 may provide an additional clamping force, and the clamping force between the fixing structure 1610 and the user's body may be increased. When the piezoelectric element 1630 deforms away from the user's body, the clamping force between the fixing structure 1610 and the user's body decreases.

It should be noted that the functional element 1620 and the bending component 1611 shown in FIG. 16 may be the vibration transmission element 130 in FIG. 1 (e.g., the output assembly 132 and the ear hook 131). The functional element 1620 including the vibration transmission element 130 can refer to FIG. 2 and related descriptions thereof. In addition, the functional element 1620 shown in FIG. 16 is not limited to the speaker, but may also be a hearing aid.

Figure 17:
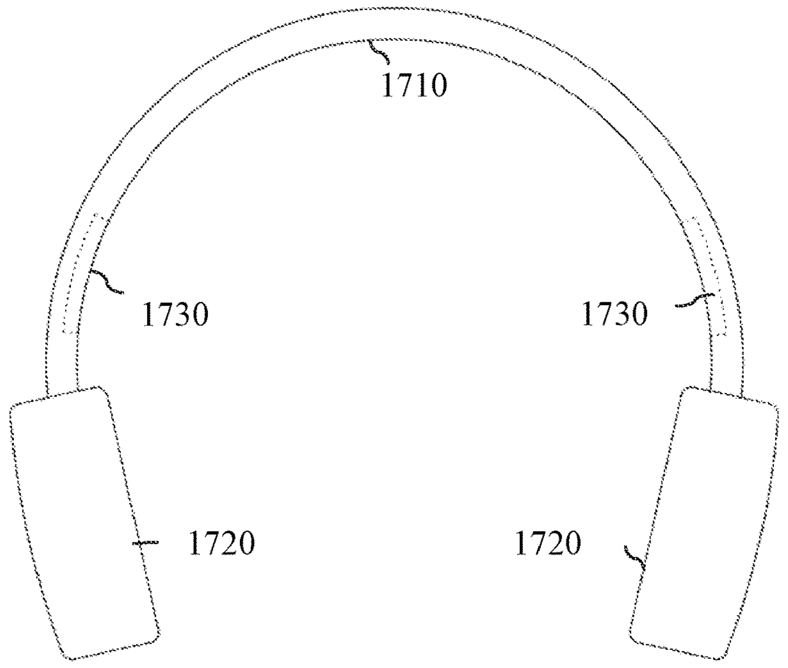
FIG. 17 is a schematic diagram illustrating a structure of an exemplary headset according to some embodiments of the present disclosure.

FIG. 17 is a schematic diagram illustrating the structure of an exemplary headset according to some embodiments of the present disclosure. As shown in FIG. 17, a wearable device may be a headset. As shown in FIG. 17, the wearable device may include a fixing structure 1710, a functional component 1720, and a piezoelectric element 1730. The fixing structure 1710 may be a head hook adapted to the user's overhead region. Two ends of the fixing structure 1710 may be respectively connected to the functional components 1720, and the piezoelectric element 1730 may be disposed on the fixing structure 1710. In some embodiments, the functional element 1720 may be an air-conduction speaker. In some embodiments, when the user wears the wearable device, the fixing structure 1710 may be suspended on the user's head, and the functional element 1720 may cover the user's ear under an action of the fixing structure 1710.

In some embodiments, there may be one or more piezoelectric elements 1730. For example, when there is only one piezoelectric element 1730, the piezoelectric element 1730 may be located in a middle region of the fixing structure 1710, that is, the piezoelectric element 1730 may be located on the fixing structure 1710 at a position farthest from the functional element 1720. When the user wears the wearable device, a central point of the fixing structure 1710 may be close to the top of the user's head, and a deformation degree at this position is large. In some embodiments, there may be two, three, or even more piezoelectric elements 1730. Details of the specific setting manner of the piezoelectric elements 1730 may be found in FIG. 16 and related descriptions thereof.

Figure 18:
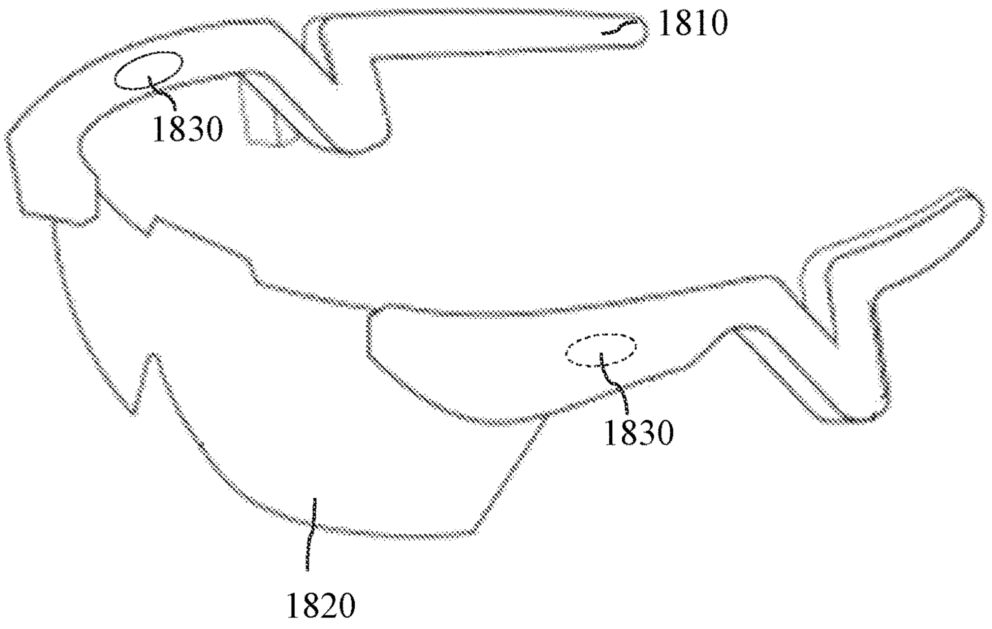
FIG. 18 is a schematic diagram illustrating a structure of exemplary glasses according to some embodiments of the present disclosure.

FIG. 18 is a schematic diagram illustrating a structure of exemplary glasses according to some embodiments of the present disclosure. As shown in FIG. 18, a wearable device may be a pair of glasses. The wearable device may include a fixing structure 1810, a functional element 1820, and a piezoelectric element 1830. The fixing structure 1810 may be a set of temples, the functional element 1820 may be a lens connected to an end of the fixing structure 1810, and the piezoelectric element 1830 may be disposed on the fixing structure 1810. When the user wears the wearable device, the fixing structure 1810 may be suspended on the user's ear.

When the fixing structure 1810 is a temple, one end of the temple is connected to the lens. When the user wears the glasses, the deformation degree near the end is large. In addition, the deformation degree at a position away from the end of the temple structure is large. In some embodiments, the piezoelectric element 1830 may be disposed on the fixing structure 1810 at a position near the lens or away from the lens to ensure the sensitivity of the piezoelectric element 1830 to the deformation of the fixing structure 1810. In some embodiments, the piezoelectric element 1830 may also be disposed in the middle of the temple along a length direction of the temple. In some embodiments, the functional unit 1820 may include a frame structure to which the lens is connected. The frame structure may be connected to the temple through a connection rod (not shown in the figure). when the user wears the pair of glasses, the connection rod may be subjected to a relatively high stress. In some embodiments, the piezoelectric element 1830 may also be disposed on the connection rod. In some embodiments, one or more piezoelectric elements 1830 may be disposed on the fixing structure 1810 of the wearable device. For example, the piezoelectric element may be located on a single temple when there is only one piezoelectric element. As another example, when there are two piezoelectric elements, the piezoelectric elements may be located on two temples respectively or on the same temple. In some embodiments, the piezoelectric element 1830 may be disposed along the extension direction of the fixing structure 1810 such that the piezoelectric element 1830 may sense the deformation of the fixing structure 1810 to a greater extent. A processor of the wearable device may interact with the plurality of piezoelectric elements 1830 at the same time to realize the adjustment of the clamping force between the user's head and the fixing structure. Details regarding monitoring and adjusting the clamping force may be found in FIG. 16 in which the processor monitors and controls the deformation of the fixing structure through the piezoelectric elements.

In some embodiments, the wearable device may be a pair of glasses with an audio function, and the fixing structure 1810 may include a speaker or a hearing aid, etc. Specifically, when the user wears the wearable device, the functional unit 1820 may be located on the user's face, the fixing structure 1810 may be attached to the user's ear from one side of the functional unit 1820 and is supported on the user's ear, and the speaker or the hearing aid disposed on the fixing structure 1810 may be close to the user's binaural. In some embodiments, to facilitate the installation of the speaker or the hearing aid, the temples on both sides of the fixing structure 1810 may respectively include a concave structure. The speaker or the hearing aid may be disposed on the concave structure.

Figure 19:
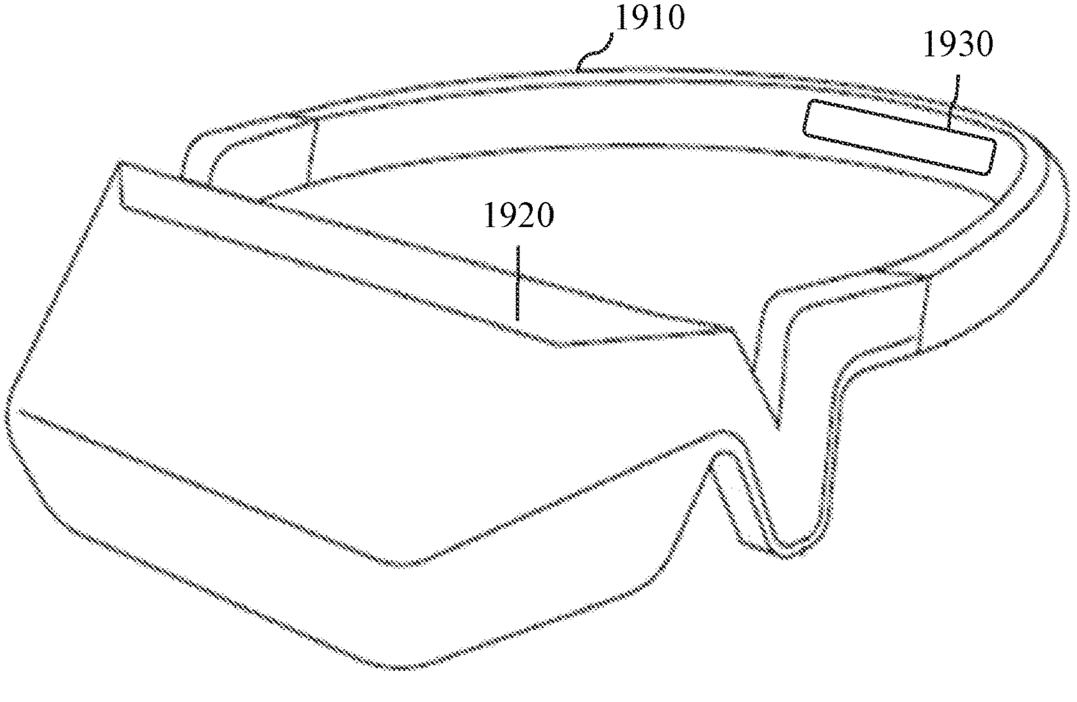
FIG. 19 is a schematic diagram illustrating a structure of an exemplary wearable device according to some embodiments of the present disclosure.

FIG. 19 is a schematic diagram illustrating a structure of an exemplary wearable device according to some embodiments of the present disclosure. As shown in FIG. 19, the wearable device may be a VR or AR device. The wearable device may include a fixing structure 1910, a functional element 1920, and a piezoelectric element 1920. The fixing structure 1910 may be a rear hook. Two ends of the fixing structure 1910 may be connected to the functional elements 1920, respectively. The functional element 1920 may be an optical display fixed to an end of the fixing structure 1910. The optical display may be used to display images and colors. In some embodiments, the fixing structure 1910 may place the functional element 1920 at the user's eyes. The fixing structure 1910 may surround and be placed on the user's head when the user wears the wearable device.

In some embodiments, to increase a sensitivity of the piezoelectric element 1930 to the deformation degree of the fixing structure 1910, the piezoelectric element 1930 may be disposed in a middle region of the fixing structure 1910 (e.g., the rear hook). That is, the piezoelectric element 1930 may be disposed on the fixing structure 1910 at a position farthest from the functional element 1920. When the user wears the wearable device shown in FIG. 19, the piezoelectric element 1930 may be located on the fixing structure 1910 near the rear side of the user's head, and the fixing structure 1910 has a large deformation degree at this position. In some embodiments, there may be one or more piezoelectric elements 1920. Details regarding the piezoelectric element disposed on the fixing structure 1910 may be found in FIG. 16 and related descriptions thereof.

In some embodiments, the fixing structure 1910 may include a processor. The processor may also be disposed independently from the wearable device. Specifically, the piezoelectric element 1920 may detect the deformation of the fixing structure 1910 and send a voltage to the processor based on the deformation degree of the fixing structure 1910. The processor may send a control signal to the piezoelectric element based on a voltage value. Details regarding monitoring and adjusting the clamping force may be found in FIG. 16 in which the processor monitors and controls the deformation of the fixing structure through the piezoelectric element.

In some embodiments, the wearable device may be the VR or AR device with an audio function, and the fixing structure 1910 may include a speaker or a hearing aid, etc. In some embodiments, the speaker or the hearing aid on the fixing structure 1910 may be disposed close to the user's ear. In some embodiments, for the convenience of installing the speaker or the hearing aid, the fixing structure 1910 may include a concave structure near the ear, and the speaker or the hearing aid may be installed on the concave structure. In some embodiments, the fixing structure 1910 may include the concave structures near the ears, and two speakers or hearing aids may be disposed on the concave structure on either side.

It should be noted that the wearable devices shown in FIGS. 16-19 are for illustrative purposes only and do not form any limitation. For example, the wearable devices may also be smart watches, helmets, or other devices. Correspondingly, the piezoelectric elements may be located on a strap of a smartwatch or inside the helmet. In some embodiments, the piezoelectric element may also be used only to adjust the shape of the fixing structure such that the user may wear the wearable device with an appropriate clamping force. For example, the user may input control commands through a control system of the wearable device or electronic devices (e.g., a mobile phone, a tablet, etc.) connected to the wearable device. Based on the control commands, the processor may control the deformation degree of the piezoelectric element to adjust the shape of the fixing structure.

The basic concepts have been described above. Obviously, for those skilled in the art, the above-detailed disclosure is only an example, and does not constitute a limitation to the present disclosure. Although not expressly stated here, various modifications, improvements and amendments to the present disclosure may be made by those skilled in the art. Such modifications, improvements, and amendments are suggested in the present disclosure, so such modifications, improvements, and amendments still belong to the spirit and scope of the exemplary embodiments of the present disclosure.

At the same time, certain terminology has been used to describe embodiments of the present disclosure. For example, "one embodiment", "an embodiment", and/or "some embodiments" refer to a certain feature, structure or characteristic related to at least one embodiment of the present disclosure. Therefore, it should be emphasized and noted that two or more references to "an embodiment" or "one embodiment" or "an alternative embodiment" in different places in the present disclosure do not necessarily refer to the same embodiment. In addition, certain features, structures or characteristics of one or more embodiments of the present disclosure may be properly combined.

Furthermore, unless explicitly stated in the claims, the order of processing elements and sequences described in the disclosure, the use of numbers and letters, or the use of other designations are not used to limit the order of the process and methods of the disclosure. While the foregoing disclosure has discussed by way of various examples some embodiments of the invention that are presently believed to be useful, it should be understood that such detail is for illustration only and that the appended claims are not limited to the disclosed embodiments, but rather, the claims are intended to cover all modifications and equivalent combinations that fall within the spirit and scope of the embodiments of the present disclosure. For example, although the system components described above may be implemented by hardware devices, they may also be implemented in a software-only solution, such as installing the described system on an existing server or a mobile device.

Similarly, it should be noted that in order to simplify the expression disclosed in the present disclosure and help the understanding of one or more embodiments thereof, in the foregoing description of the embodiments of the present disclosure, sometimes multiple features are combined into one embodiment, drawing or description thereof. This method of disclosure does not, however, imply that the subject matter of the disclosure requires more features than are recited in the claims. Rather, the claimed subject matter may lie in less than all features of a single foregoing disclosed embodiment.

In some embodiments, numbers describing the quantity of components and attributes are used. It should be understood that such numbers used in the description of the embodiments use the modifiers "about", "approximately" or "substantially" in some examples. Unless otherwise stated, the "about", "approximately" or "substantially" indicates that the stated figure allows for a variation of ±20%. Accordingly, in some embodiments, the numerical parameters used in the present disclosure and the claims are approximations that may vary depending upon the desired features of individual embodiments. In some embodiments, the numerical parameters should take into account the specified significant digits and use a general digit reservation method. Notwithstanding that the numerical fields and parameters used in some embodiments of the present disclosure to confirm the breadth of their ranges are approximations, in particular embodiments such numerical values are set as precisely as practicable.

Each patent, patent application, patent application publication, and other material, such as article, book, specification, publication, document, etc., cited in this application is hereby incorporated by reference in its entirety. Application history documents that are inconsistent with or conflict with the contents of the present disclosure are excluded, as are documents (currently or hereafter appended to the present disclosure) that limit the broadest scope of the claims of the present disclosure. It should be noted that, if there is any inconsistency or conflict between the descriptions, definitions and/or terms used in the attached materials of the present disclosure and the content of the present disclosure, the descriptions, definitions and/or terms used in the present disclosure shall prevail.

Finally, it should be understood that the embodiments described in the present disclosure are only used to illustrate the principles of the embodiments thereof. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. An acoustic output device, comprising:

a first piezoelectric element configured to generate vibrations based on an audio signal;

a fixing structure configured to place the acoustic output device near a user's ear without blocking the user's ear canal, an end of the fixing structure being connected to one end of the first piezoelectric element; and a vibration transmission component including an ear hook and an output assembly, one end of the ear hook being connected to an end of the first piezoelectric element away from the fixing structure, the other end of the ear hook being connected to the output assembly, the output assembly receiving the vibrations of the first piezoelectric element through the ear hook and outputting sound, and a frequency response curve of the sound having at least two resonant peaks.

2. The acoustic output device of claim 1, wherein the output assembly includes a contact surface in contact with the user's face, the end of the ear hook connected to the output assembly is connected to a side of the output assembly and has a first connection surface, a projection of the ear hook on the first connection surface is an ear hook projection curve, a first straight line passes through a center point of the first connection surface and is tangent to the ear hook projection curve, and an angle between the contact surface and the first straight line is in a range of 0°-50°.

3. The acoustic output device of claim 2, wherein the ear hook is connected to the first piezoelectric element and has a second connection surface, a connection point between the ear hook and the first piezoelectric element is in the second connection surface, a straight line connecting the connection point between the ear hook and the first piezoelectric element and a connection point between the ear hook and the output assembly is defined as a second straight line, and an angle between a projection of the first piezoelectric element on the second connection surface and the second straight line is in a range of −20°-−20°.

4. The acoustic output device of claim 2, wherein when the user wears the acoustic output device, the contact surface of the output assembly fits against a facial region near the user's ear.

5. The acoustic output device of claim 1, wherein the fixing structure is elastic and the fixing structure is suspended on a rear side of the user's head when the user wears the acoustic output device.

6. The acoustic output device of claim 1, wherein the at least two resonant peaks include a first resonant peak, a resonant frequency corresponding to the first resonant peak is in a range of 5 Hz-30 Hz.

7. The acoustic output device of claim 1, wherein the output assembly includes an acoustic unit located inside the output assembly, a side wall of the output assembly includes a sound hole, and a sound generated by the acoustic unit is transmitted to the outside of the output assembly through the sound hole.

8. The acoustic output device of claim 7, comprising:

a frequency division module configured to divide the audio signal into a high-frequency band component and a low-frequency band component;

a high-frequency signal processing module coupled to the frequency division module and configured to generate a high-frequency output signal based on the high-frequency band component; and a low-frequency signal processing module coupled to the frequency division module and configured to generate a low-frequency output signal based on the low-frequency band component.

9. The acoustic output device of claim 8, wherein a division point between the high-frequency band component and the low-frequency band component is in a range of 200 Hz-600 Hz, or is in a range of 1000 Hz-3000 Hz.

10. The acoustic output device of claim 9, wherein resonant frequencies corresponding to two resonant peaks closest to the division point in the at least two resonant peaks are $f_1$ and $f_0'$, respectively, and $f_1$ and $f_0'$ satisfy $$0 \leq \frac{|f_1 - f_0'|}{f_1} \leq 4.$$

11. The acoustic output device of claim 1, comprising:

a second piezoelectric element, the second piezoelectric element being connected to the fixing structure and configured to generate a voltage in response to a deformation of the fixing structure; and a processor configured to receive the voltage and, in response to that the voltage is not in a preset voltage range, output a control signal for generating a driving voltage applied to the second piezoelectric element to adjust a shape of the fixing structure.

12. The acoustic output device of claim 11, wherein the second piezoelectric element is located on the fixing structure at a position farthest from the output assembly.

13. The acoustic output device of claim 11, wherein the second piezoelectric element includes a first sub-piezoelectric element and a second sub-piezoelectric element, the first sub-piezoelectric element generating the voltage with the deformation of the fixing structure; and the processor receives the voltage and, in response to that the voltage is not in the preset voltage range, outputs a control signal for generating a driving voltage applied to the second sub-piezoelectric element to adjust the shape of the fixing structure.

14. The acoustic output device of claim 11, wherein the fixing structure with an adjusted shape provides a clamping force for the output assembly to fit near the user's ear, and the clamping force is in a range of 0.1 N-0.8 N.

15. The acoustic output device of claim 13, wherein the first sub-piezoelectric element is located on the fixing structure at a position farthest from the output assembly, and the second sub-piezoelectric element is located at a position of the fixing structure between the first sub-piezoelectric element and the ear hook.

16. A wearable device, comprising:

a fixing structure configured to place the wearable device at a user's head;

a piezoelectric element connected to the fixing structure and configured to generate a voltage in response to a deformation of the fixing structure; and a processor configured to receive the voltage and, in response to that the voltage is not in a preset voltage range, output a control signal for generating a driving voltage applied to the piezoelectric element to adjust a shape of the fixing structure.

17. The wearable device of claim 16, further comprising:

a first piezoelectric component configured to generate vibrations based on an audio frequency signal, and the first piezoelectric element is connected to an end of the fixing structure; and a vibration transmission component including an ear hook and an output assembly, one end of the ear hook being connected to an end of the first piezoelectric element away from the fixing structure, the other end of the ear hook being connected to the output assembly, the fixing structure placing the output assembly near the user's ear without blocking the user's ear canal, the output assembly receiving the vibrations of the first piezoelectric element through the ear hook and outputting sound, and a frequency response curve of the sound having at least two resonant peaks.

18. The wearable device of claim 16, comprising a speaker connected to an end of the fixing structure, wherein the fixing structure places the speaker near the user's ear without blocking the user's ear canal, and when the user wears the wearable device, the fixing structure is suspended on a rear side of the user's head.

19. The wearable device of claim 16, comprising an air-conduction speaker connected to an end of the fixing structure, wherein the fixing structure places the air-conduction speaker at a position covering the user's ear, and when the user wears the wearable device, the fixing structure is suspended on a top of the user's head.

20. The wearable device of claim 16, comprising a visual component connected to an end of the fixing structure, wherein the fixing structure places the visual component at the user's eyes, and when the user wears the wearable device, the fixing structure is suspended on the user's ear.

* * * * *